United States Patent
Wu et al.

(10) Patent No.: US 8,513,478 B2
(45) Date of Patent: Aug. 20, 2013

(54) PROCESS TO PRODUCE POLYALPHAOLEFINS

(75) Inventors: Margaret M. Wu, Skillman, NJ (US); Mark P. Hagemeister, Houston, TX (US); Norman Yang, Westfield, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 952 days.

(21) Appl. No.: 11/832,287

(22) Filed: Aug. 1, 2007

(65) Prior Publication Data

US 2009/0036725 A1   Feb. 5, 2009

(51) Int. Cl.
*C07C 2/22* (2006.01)

(52) U.S. Cl.
USPC ............ 585/523; 585/502; 585/520; 585/521; 585/522

(58) Field of Classification Search
USPC ......... 585/502, 520, 521, 522, 523; 526/126, 526/131, 134, 170
See application file for complete search history.

(56) References Cited

U.S. PATENT DOCUMENTS

| | | |
|---|---|---|
| 2,978,442 A | 4/1961 | Brightbill et al. |
| 3,149,178 A | 9/1964 | Hamilton |
| 3,164,578 A | 1/1965 | Baker et al. |
| 3,382,291 A | 5/1968 | Brennan |
| 3,742,082 A | 6/1973 | Brennan |
| 3,769,363 A | 10/1973 | Brennan |
| 3,780,128 A | 12/1973 | Shubkin |
| 3,876,720 A | 4/1975 | Heilman et al. |
| 3,883,417 A | 5/1975 | Woo et al. |
| 4,016,349 A | 4/1977 | McKenna |
| 4,132,663 A | 1/1979 | Heilman et al. |
| 4,149,178 A | 4/1979 | Estes |
| 4,172,855 A | 10/1979 | Shubkin et al. |
| 4,180,575 A | 12/1979 | Rochling et al. |
| 4,239,930 A | 12/1980 | Allphin et al. |
| 4,263,465 A | 4/1981 | Sheng et al. |
| 4,263,712 A | 4/1981 | Schroder |
| 4,367,352 A | 1/1983 | Watts, Jr. et al. |
| 4,413,156 A | 11/1983 | Watts, Jr. et al. |
| 4,434,408 A | 2/1984 | Baba et al. |
| 4,451,684 A | 5/1984 | Pasky |
| 4,469,912 A | 9/1984 | Blewett et al. |
| 4,587,368 A | 5/1986 | Pratt |
| 4,701,489 A | 10/1987 | Hughes et al. |
| 4,704,491 A | 11/1987 | Tsutsui et al. |
| 4,827,064 A | 5/1989 | Wu |
| 4,827,073 A | 5/1989 | Wu |
| 4,892,851 A | 1/1990 | Ewen et al. |
| 4,910,355 A | 3/1990 | Shubkin et al. |
| 4,912,272 A | 3/1990 | Wu |
| 4,914,254 A | 4/1990 | Pelrine |
| 4,926,004 A | 5/1990 | Pelrine |
| 4,950,822 A | 8/1990 | Dileo et al. |
| 4,956,122 A | 9/1990 | Watts et al. |
| 4,962,262 A * | 10/1990 | Winter et al. ................. 585/512 |
| 4,967,032 A | 10/1990 | Ho et al. |
| 4,990,709 A | 2/1991 | Wu |
| 4,990,771 A | 2/1991 | Minoura et al. |
| 5,012,020 A | 4/1991 | Jackson et al. |
| 5,017,299 A | 5/1991 | Gutierrez et al. |
| 5,017,714 A | 5/1991 | Welborn, Jr. |
| 5,068,487 A | 11/1991 | Theriot |
| 5,087,788 A | 2/1992 | Wu |
| 5,177,276 A | 1/1993 | Beach et al. |
| 5,186,851 A | 2/1993 | Gutierrez et al. |
| 5,188,724 A | 2/1993 | Heilman et al. |
| 5,220,100 A | 6/1993 | Massie et al. |
| 5,264,642 A | 11/1993 | Wu |
| 5,369,196 A * | 11/1994 | Matsumoto et al. .......... 526/127 |
| 5,382,739 A | 1/1995 | Atkins et al. |

(Continued)

FOREIGN PATENT DOCUMENTS

| | | |
|---|---|---|
| EP | 0 321 852 | 12/1987 |
| EP | 0 277 004 | 8/1988 |

(Continued)

OTHER PUBLICATIONS

G. Gokel, ed., Dean's Handbook of Organic Chemistry, 2nd edition, McGraw-Hill, 2004, available on-line at http://knovel.com.*

Seraidaris, T. et al., "*High-Molar-Mass Polypropene with Tunable Elastic Properties by Hafnocene/Borate Catalysts*," Journal of Polymer Science: Part A: Polymer Chemistry, 2006, vol. 44, pp. 4743-4751.

Wills, J.G., "*Synthetic Lubricants*," Lubrication Fundamentals, Marcel Dekker Inc., New York, 1980, pp. 75-80.

Naga N. et al., "Effect of Co-catalyst system on α-olefin polymerization with *rac*- and *meso*- [dimethylsilylenebis(2,3,5-trimethyl-cyclopentadienyl)]zirconium dichloride," Macromol. Rapid Commun. 18, 581-589 (1997).

(Continued)

*Primary Examiner* — In Suk Bullock
*Assistant Examiner* — Bradley Etherton
(74) *Attorney, Agent, or Firm* — Catherine L. Bell; Nancy T. Krawczyk; Leandro Arechederra, III

(57) ABSTRACT

Liquid poly-alpha-olefins having a $KV_{100}$ of 2 to 6000 cSt, 20 weight percent dimer or less and a viscosity index of 60 or more are obtained by contacting in a reaction zone, in the presence of from 0 to 60 psi hydrogen, C3 to C20 alpha-olefin monomers with a non-coordinating anion activator, a single bridged meso-metallocene transition metal compound having less than about 35 wt % racemic isomer, and a co-activator. The molar ratio of activator to meso-metallocene is from 10:1 to 0.1:1, and the alpha-olefin monomers in the feed components are present in at least 20 wt % or more based upon the weight of the meso-metallocene, non-coordinating anion activator, co-activator, monomers, and solvent or diluent. The productivity of the process is at least 50,000 g of total product per gram of transition metal compound and no more than 5% monomer is converted from olefin to alkane.

24 Claims, No Drawings

(56) References Cited

U.S. PATENT DOCUMENTS

| | | | |
|---|---|---|---|
| 5,462,995 A | 10/1995 | Hosaka et al. | |
| 5,498,815 A | 3/1996 | Schaerfl, Jr. et al. | |
| 5,552,504 A | 9/1996 | Bennett et al. | |
| 5,637,400 A | 6/1997 | Brekner et al. | |
| 5,679,812 A | 10/1997 | Winter et al. | |
| 5,688,887 A | 11/1997 | Bagheri et al. | |
| 5,690,832 A | 11/1997 | Tavlarides et al. | |
| 5,731,254 A | 3/1998 | Winter et al. | |
| 5,811,379 A | 9/1998 | Rossi et al. | |
| 5,846,896 A | 12/1998 | Ewen | |
| 5,852,143 A | 12/1998 | Sishta et al. | |
| 5,859,159 A | 1/1999 | Rossi et al. | |
| 6,043,401 A | 3/2000 | Bagheri et al. | |
| 6,087,307 A | 7/2000 | Kaminski et al. | |
| 6,133,209 A | 10/2000 | Rath et al. | |
| 6,147,271 A | 11/2000 | Strebel et al. | |
| 6,180,575 B1 | 1/2001 | Nipe | |
| 6,388,032 B1 | 5/2002 | Yamaura et al. | |
| 6,414,090 B2 * | 7/2002 | Minami et al. | 525/338 |
| 6,414,091 B2 | 7/2002 | Moritomi et al. | |
| 6,479,722 B1 | 11/2002 | De Wet et al. | |
| 6,548,723 B2 | 4/2003 | Bagheri et al. | |
| 6,548,724 B2 | 4/2003 | Bagheri et al. | |
| 6,642,169 B2 * | 11/2003 | Weatherhead | 502/118 |
| 6,646,174 B2 | 11/2003 | Clarembeau | |
| 6,706,828 B2 * | 3/2004 | DiMaio | 526/160 |
| 6,713,438 B1 | 3/2004 | Bailargeon et al. | |
| 6,824,671 B2 | 11/2004 | Goze et al. | |
| 6,858,767 B1 * | 2/2005 | DiMaio et al. | 585/521 |
| 6,960,700 B1 | 11/2005 | Sethna et al. | |
| 7,060,768 B2 | 6/2006 | Brookhart et al. | |
| 7,129,197 B2 | 10/2006 | Song et al. | |
| 7,473,815 B2 | 1/2009 | Lambert et al. | |
| 7,544,850 B2 | 6/2009 | Goze et al. | |
| 7,547,811 B2 | 6/2009 | Kramer et al. | |
| 7,592,497 B2 | 9/2009 | Yang et al. | |
| 7,601,256 B2 | 10/2009 | Beall | |
| 2001/0041817 A1 | 11/2001 | Bagheri et al. | |
| 2001/0041818 A1 | 11/2001 | Bagheri et al. | |
| 2003/0055184 A1 * | 3/2003 | Song et al. | 526/160 |
| 2004/0033908 A1 | 2/2004 | Deckman et al. | |
| 2004/0087746 A1 | 5/2004 | Razavi | |
| 2004/0097772 A1 | 5/2004 | Deckers et al. | |
| 2004/0147693 A1 | 7/2004 | DiMaio | |
| 2004/0220359 A1 | 11/2004 | Abhari et al. | |
| 2004/0225088 A1 | 11/2004 | Vaughan et al. | |
| 2004/0230016 A1 | 11/2004 | Blackbrow et al. | |
| 2005/0059563 A1 | 3/2005 | Sullivan et al. | |
| 2005/0101761 A1 | 5/2005 | Lambert et al. | |
| 2005/0183988 A1 | 8/2005 | Freerks et al. | |
| 2007/0000807 A1 | 1/2007 | Wu et al. | |
| 2007/0011832 A1 | 1/2007 | Keidel et al. | |
| 2007/0043248 A1 | 2/2007 | Wu et al. | |
| 2007/0208151 A1 | 9/2007 | Okada et al. | |
| 2009/0005279 A1 | 1/2009 | Wu et al. | |
| 2009/0156874 A1 | 6/2009 | Patil et al. | |
| 2009/0281360 A1 | 11/2009 | Knowles et al. | |
| 2010/0069687 A1 | 3/2010 | Kosover et al. | |

FOREIGN PATENT DOCUMENTS

| | | |
|---|---|---|
| EP | 0 277 007 | 8/1988 |
| EP | 0 284 708 | 10/1988 |
| EP | 0 349 276 | 1/1990 |
| EP | 0 377 306 | 7/1990 |
| EP | 0 403 866 | 12/1990 |
| EP | 0 513 380 | 11/1992 |
| EP | 0 613 873 | 9/1994 |
| EP | 0 680 942 | 11/1995 |
| EP | 0 930 320 | 7/1999 |
| EP | 0 992 517 | 4/2000 |
| EP | 1 028 128 | 8/2000 |
| EP | 1 309 633 | 5/2003 |
| EP | 1 342 707 | 9/2003 |
| EP | 1 607 415 | 12/2005 |
| GB | 938069 | 9/1963 |
| IN | 191553 | 6/2003 |
| JP | 6336590 | 12/1994 |
| JP | 2005-200446 | 7/2005 |
| WO | WO 96/23751 | 8/1996 |
| WO | WO 99/67347 | 12/1999 |
| WO | 00/58423 | 10/2000 |
| WO | WO 02/14384 | 2/2002 |
| WO | 03/009136 | 1/2003 |
| WO | WO 03/020856 | 3/2003 |
| WO | 03/051943 | 6/2003 |
| WO | 03/071369 | 8/2003 |
| WO | 03/104292 | 12/2003 |
| WO | WO 2004/046214 | 6/2004 |
| WO | 2007/011462 | 1/2007 |
| WO | 2007/011973 | 1/2007 |
| WO | WO 2007/011459 | 1/2007 |
| WO | WO 2007/011832 | 1/2007 |
| WO | 2007/145924 | 12/2007 |
| WO | 2007/146081 | 12/2007 |
| WO | 2008/010862 | 1/2008 |
| WO | 2008/010865 | 1/2008 |
| WO | 2009/017953 | 2/2009 |
| WO | 2009/137264 | 11/2009 |

OTHER PUBLICATIONS

Naga N. et al, "Polymerization behavior of α-olefins with *rac*- and *meso*-type *ansa*-metallocene catalysts: Effects of cocatalyst and metallocene ligand," Macromol. Chem. Phys. 200, 1587-1594 (1999).

J. Brennan, "*Wide-Temperature Range Synthetic Hydrocarbon Fluids*", Ind. Eng. Chem. Prod. Res. Dev., 1980, vol. 19, pp. 2-6.

K. Denbigh, "*The Kinetics of Continuous Reaction Processes: Application to Polymerization*", J. Applied Chem, 1951, vol. 1, pp. 227-236.

K. Denbigh, "*Continuous Reactions: Part II. The Kinetics of Steady State Polymerisation*", Trans Faraday Soc., 1947, vol. 43, pp. 648-660.

A. Munoz-Escalona et al., "*Single-Site Supported Catalysts for Ethylene Polymerization*", Metallocene Tech., 1999, pp. 2242-2246.

Z. Fan et al., "*Effect of Ethoxy- And Methoxysilane Donors in Propene/l-Hexene Copolymerization With High-Yield Supported Ziegler-Natta Catalysts*", Macromolecular Chemistry and Physics, 1994, vol. 195, pp. 3889-3899.

G. Gokel ed, Dean's Handbook of Organic Chemistry, 2nd Edition, McGraw-Hill, 2004, available on-line at hhtp://knovel.com.

M. LeVan et al. "*Adsorption and Ion Exchange*" Perry's Chemical Engineer's Handbook, 7th ed. 1997 pp. 16-1-16-66.

O. Levenspiel, "*Ch. 7 Design for Multiple Reactions*", Chemical Reaction Engineering, 2nd ed., 1972, pp. 196-209.

F. Rodriguez, "*The Molecular Weight of Polymers*", Principles of Polymer Systems, 1970, Chapter 6, pp. 115-144.

M. Sacchi et al., "*Use of Different Alkoxysilanes As External Donors In MgCl$_2$-Supported Ziegler-Natta Catalysts To Obtain Propene/l-Butene Copolymers With Different Microstructure*", Macromolecular Chemistry and Physics, 1994, vol. 195, pp. 2805-2816.

"*Mobil Releases SuperSyn PAOs*", Lubrication Engineers, 1999, vol. 55, Part 8, pp. 45.

TIBA data, "*TIBA datasheet*" available on-line at www.albermarle.com on Aug. 26, 2010.

\* cited by examiner

PROCESS TO PRODUCE POLYALPHAOLEFINS

PRIORITY CLAIM FOR UNITED STATES

This invention is a continuation-in-part of and claims priority to U.S. Ser. No. 11/489,313, filed Jul. 19, 2006, which claims the benefit of and priority to U.S. Ser. No. 60/700,600, filed Jul. 19, 2005.

This invention also is a continuation-in-part of and claims priority to PCT/US2006/027591, filed Jul. 14, 2006 which claims the benefit of and priority to U.S. Ser. No. 60/700,603, filed Jul. 19, 2005 and PCT/US2006/021399 filed Jun. 2, 2006, which claims the benefit of and priority to U.S. Ser. No. 60/700,603, filed Jul. 19, 2005.

This invention also is a continuation-in-part of and claims priority to PCT/US2006/021231, filed Jun. 2, 2006 which claims the benefit of and priority to U.S. Ser. No. 60/700,600, filed Jul. 19, 2005.

FIELD OF THE INVENTION

This invention relates to a process to produce liquid poly-alpha-olefins (PAOs) in the presence of a meso-metallocene catalyst with a non-coordinating anion activator and, optionally, a co-activator.

DESCRIPTION OF RELATED ART

Efforts to improve upon the performance of natural mineral oil-based lubricants by the synthesis of oligomeric hydrocarbon fluids have been the subject of important research and development in the petroleum industry for at least fifty years. These efforts have led to the relatively recent market introduction of a number of synthetic lubricants. In terms of lubricant property improvement, the thrust of the industrial research efforts involving synthetic lubricants has been towards fluids exhibiting useful viscosities over a wide temperature range, i.e., improved viscosity index (VI), while also showing lubricities, thermal stabilities, oxidative stabilities and pour points equal to or better than those for mineral oil.

The viscosity-temperature relationship of a lubricating oil is one of the main criteria considered when selecting a lubricant for a particular application. The mineral oils commonly used as a base for single and multigrade lubricants exhibit a relatively large change in viscosity with a change in temperature. Fluids exhibiting such a relatively large change in viscosity with temperature are said to have a low viscosity index (VI). VI is an empirical number which indicates the rate of change in the viscosity of an oil within a given temperature range. A high VI oil, for example, will thin out at elevated temperatures more slowly than a low VI oil. Usually, a high VI oil is more desirable because it has higher viscosity at higher temperature, which translates into better lubrication and better protection of the contacting machine elements, preferably at high temperatures and or at temperatures over a wide range. VI is calculated according to ASTM method D 2270.

Good low temperature properties of a lubricant are also important if the lubricant is expected to provide lubrication at low temperature environment. These low temperature properties can be measured by pour points of pure fluids according to ASTM D 97, by low temperature Brookfield viscosities of pure or blended fluids according to ASTM D 2983, or other appropriate method such as Cold Cranking Simulator viscosity (CCS), etc. Good shear stability of a lubricant is also becoming more important as newer equipment or engines are often operated under more severe conditions. Shear stability of a pure fluid or lubricant blends can be measured by many methods, such as sonic shear test according to ASTM D 2603 method or tapered roller bearing (TRB) shear test according to CEC L-45-T/A to D methods, etc.

PAOs comprise a class of hydrocarbons manufactured by the catalytic oligomerization (polymerization to low-molecular-weight products) of linear α-olefin (LAO) monomers. These typically range from 1-octene to 1-dodecene, with 1-decene being a preferred material, although oligomeric copolymers of lower olefins such as ethylene and propylene may also be used, including copolymers of ethylene with higher olefins as described in U.S. Pat. No. 4,956,122 and the patents referred to therein. PAO products have achieved importance in the lubricating oil market. Typically there are two classes of synthetic hydrocarbon fluids (SHF) produced from linear alpha-olefins, the two classes of SHF being denoted as PAO and HVI-PAO (high viscosity index PAO's). PAO's of different viscosity grades are typically produced using promoted $BF_3$ or $AlCl_3$ catalysts.

Specifically, PAOs may be produced by the polymerization of olefin feed in the presence of a catalyst such as $AlCl_3$, $BF_3$, or promoted $AlCl_3$, $BF_3$. Processes for the production of PAOs are disclosed, for example, in the following patents: U.S. Pat. Nos. 3,149,178; 3,382,291; 3,742,082; 3,769,363; 3,780,128; 4,172,855 and 4,956,122, which are fully incorporated by reference. PAOs are also discussed in: Will, J. G. *Lubrication Fundamentals*, Marcel Dekker: New York, 1980. Subsequent to polymerization, the PAO lubricant range products are typically hydrogenated in order to reduce the residual unsaturation, generally to a level of greater than 90% of hydrogenation. High viscosity PAO's may be conveniently made by the polymerization of an alpha-olefin in the presence of a polymerization catalyst such as Friedel-Crafts catalysts. These include, for example, boron trichloride, aluminum trichloride, or boron trifluoride, promoted with water, with alcohols such as ethanol, propanol, or butanol, with carboxylic acids, or with esters such as ethyl acetate or ethyl propionate or ether such as diethyl ether, diisopropyl ether, etc. (See for example, the methods disclosed by U.S. Pat. No. 4,149,178 or 3,382,291.) Other descriptions of PAO synthesis are found in the following patents: U.S. Pat. No. 3,742,082 (Brennan); U.S. Pat. No. 3,769,363 (Brennan); U.S. Pat. No. 3,876,720 (Heilman); U.S. Pat. No. 4,239,930 (Allphin); U.S. Pat. No. 4,367,352 (Watts); U.S. Pat. No. 4,413,156 (Watts); U.S. Pat. No. 4,434,408 (Larkin); U.S. Pat. No. 4,910,355 (Shubkin); U.S. Pat. No. 4,956,122 (Watts); and U.S. Pat. No. 5,068,487 (Theriot).

Another class of HVI-PAOs may be prepared by the action of a supported, reduced chromium catalyst with an alpha-olefin monomer. Such PAOs are described in U.S. Pat. No. 4,827,073 (Wu); U.S. Pat. No. 4,827,064 (Wu); U.S. Pat. No. 4,967,032 (Ho et al.); U.S. Pat. No. 4,926,004 (Pelrine et al.); and U.S. Pat. No. 4,914,254 (Pelrine). Commercially available PAOs include SpectraSyn™ 2, 4, 5, 6, 8, 10, 40, 100 and SpectraSyn Ultra™ 150, SpectraSyn Ultra™ 300, SpectraSyn Ultra 1000, etc. (ExxonMobil Chemical Company, Houston, Tex.).

Synthetic PAOs have found wide acceptance and commercial success in the lubricant field for their superiority to mineral based lubricants. In terms of lubricant property improvement, industrial research efforts on synthetic lubricants have led to PAO fluids exhibiting useful viscosities over a wide range of temperature, i.e., improved viscosity index, while also showing lubricity, thermal stability, oxidative stability and pour point equal to or better than mineral oil. These relatively new synthetic lubricants lower mechanical friction, enhancing mechanical efficiency over the full spectrum of mechanical loads and do so over a wider range of operating conditions than mineral oil lubricants.

Performance requirements of lubricants are becoming increasingly stringent. New PAOs with improved properties, such as high viscosity index (VI), low pour point, reduced volatility, high shear stability, improved wear performance, increased thermal stability, oxidative stability, and/or wider viscosity range, are needed to meet new performance requirements for lubricants. New methods to provide such new PAOs with improved properties are also needed.

Efforts have been made to prepare various PAOs using metallocene catalyst systems. Examples include U.S. Pat. No. 6,706,828 (equivalent to US 2004/0147693), where PAOs having KV100's of 1277 cSt or less are produced from meso-forms of certain metallocene catalysts under high hydrogen pressure with methyl alumoxane as an activator. Column 12, line 21 also mentions that " . . . a neutral or anionic metal- and/or metalliod-containing component can optionally be 6,414,090, U.S. Pat. No. 6,414,091, U.S. Pat. No. 4,704,491 U.S. Pat. No. 6,133,209, and U.S. Pat. No. 6,713,438.

To date however, PAO's made with metallocenes have not found wide application in the marketplace, particularly the lubricant marketplace, due to inefficient manufacturing processes, high costs and/or property deficits. The instant invention addresses such and other needs by providing new PAO's having excellent property combinations and an improved process to produce them.

U.S. Pat. No. 6,548,724 (equivalent to US 2001/0041817 and U.S. Pat. No. 6,548,723) discloses production of oligomer oils using certain metallocene catalysts, typically in combination with methyl alumoxane. However, Examples 14 through 18 of U.S. Pat. No. 6,548,724 disclose the production of lower viscosity (KV100 11.4 to 6.7 cSt) decene PAO's using bis(cyclopentadienyl)zirconium dimethyl or bis(isopropyl-cyclopentadienyl)zirconium dichloride with N,N-dimethylanilinium tetra(perfluorophenyl)borate and triisobutyl aluminum. (See Table below)

|  | U.S. Pat. No. 6,548,724 example no | | | | |
| --- | --- | --- | --- | --- | --- |
|  | 14 | 15 | 16 | 17 | 18 |
| Catalyst | $Cp_2ZrMe_2$ | $Cp_2ZrMe_2$ | $Cp_2ZrMe_2$ | $(iPrCp)_2ZrCl_2$ | $(iPrCp)_2ZrCl_2$ |
| Mole wt, g/mole | 251.5 | 251.5 | 251.5 | 376.1 | 376.1 |
| Catalyst wt., mg | 8.8025 | 8.8025 | 8.8025 | 13.1635 | 13.1635 |
| Activator Z, mg | 11.1 | 28.035 | 28.035 | 28.035 | 28.035 |
| TIBA, gram | 0.1572 | 0.1572 | 0.1572 | 0.1572 | 0.1572 |
| H2 pressure, psi | 0 | 0 | 50 | 0 | 50 |
| 1-decene feed, gram | 882 | 1096 | 1049 | 1072 | 1047 |
| Temp. ° C. | 100 | 110 | 110 | 110 | 110 |
| % dimer selectivity | 24.9 | 35.7 | 40.7 | 35.9 | 41.6 |
| 100° C. Kv, cSt | 11.4 | 6.7 | 6.7 | 5.4 | 5.3 |
| Pour point, ° C. | −57 | −59 | −59 | −66 | −69 |
| Viscosity Index | 160 |  |  |  |  |
| Catalyst Productivity |  |  |  |  |  |
| g total product/g metallocene | 12,178 | 17,870 | 41,636 | 18,437 | 40,392 |

TIBA = tri-isobutylaluminum,
Activator Z = N,N-dimethylanilinium tetra(perfluorophenyl)borate, employed with the alumoxane cocatalyst in activating the metallocene catalyst. (Emphasis added.) Column 12, line 52-55 states "[I]n general, the optional neutral or anionic metal- and/or metalliod-containing components can be utilized in a molar ratio to metallocene catalyst of from about 0.1 to about 10, preferably from about 0.5 to about 3."

Likewise, WO 02/14384 discloses, among other things, in example K the use of dimethylsilyl-bis(2-methyl-indenyl) zirconium dichloride in combination with MAO at 40° C. (at 200 psi hydrogen or 1 mole of hydrogen) to produce isotactic polydecene reportedly having a Tg of −66° C., a $KV_{100}$ of 1624, and a VI of 341. Example K most likely used the rac form of the catalyst however, page 20, line 1 WO 02/14384 appears to indicate that it may have been the meso form. Further WO 99/67347 discloses in example 1 the use of ethylidene bis(tetrahydroindenyl)zirconium dichloride in combination with MAO at 50° C. to produce a polydecene having an Mn of 11,400 and 94% vinylidene double bond content.

Others have made various PAOs, such as polydecene, using various metallocene catalysts not typically known to produce polymers or oligomers with any specific tacticity. Examples include WO 96/23751, EP 0 613 873, U.S. Pat. No. 5,688, 887, U.S. Pat. No. 6,043,401, WO 03/020856 (equivalent to US 2003/0055184), U.S. Pat. No. 5,087,788, U.S. Pat. No.

PCT/US06/21231 filed Jun. 2, 2006 claiming the benefit of U.S. Ser. No. 60/700,600, filed Jul. 19, 2005 describes the production of liquids from monomers having 5 to 24 carbon atoms using racemic metallocenes and non-coordinating anion activators.

US 2004/0220359 discloses a dual catalyst system used in dual reaction zones to produce polymers having both crystalline and amorphous content. Certain meso catalysts are disclosed as useful in the dual catalyst systems. Similarly WO 2004/046214 discloses a dual catalyst system used to produce polymers having both crystalline and amorphous content. Materials produced in US 2004/0220359 and WO 2004/046214 are generally solid at room temperature and/or have melting points. Likewise these polymers are expected to have pour points above 25° C.

WO/2007/011832 discloses a process comprising contacting a metallocene compound, an activator, optionally a co-activator, and a feed having an average carbon number of at least 4.1 and comprising at least two different alpha-olefin monomers selected from C3 to C30 alpha-olefins under conditions suitable to obtain an essentially random liquid polymer comprising said at least two feed alpha-olefins, with the proviso that any one of ethylene and propylene, if present in said feed, is present in the amount of less than 50 wt % individually, preferably in the amount of less than 50 wt % combined, based on the combined weight of alpha-olefins in said feed.

U.S. Pat. No. 6,414,090 discloses production of certain alpha-olefin polymers with double bridged metallocene compounds.

EP 0 930 320 A1 discloses production of atactic ethylene/alphaolefin copolymers having excellent optical properties, mechanical properties and or film properties produced using bridged bis cyclopentadienyl meso metallocenes. Propylene based copolymers are also discussed. These polymers are solid at room temperature and are designed for specific mechanical properties.

*Polymerization Behavior of Alpha-olefins with rac- and meso-Type Ansa-metallocene Catalysts: Effects of Cocatalyst and Metallocene Ligand*, Macromol. Chem. Phys. 200. 1587-1594 (1999) discloses polymerizations of propylene, hexene, and butene with a rac/meso blend of dimethylsilylbis(2-methylindenyl)zirconium dichloride (16.7%-rac, 83.8%-meso) combined with triphenylcarbenium tetrakis(pentafluorophenyl)borate with triethylaluminum or tri-isobutyl aluminum at 40° C. Propylene polymers having an Mn ranging from about 6400 to about 43,200 were reported. Similarly butene polymers having an Mn ranging from about 13000 to about 2400 were reported. Likewise, hexene polymers having an Mn ranging from about 900 to about 3600 were reported. For the butene and hexene polymerizations the molar ratio of Al/Zr was reported as 500:1 for the trialkyl aluminum and as 1:1 for the activator to zirconium molar ratio. No hydrogen is reported as added to the polymerizations, the olefin monomer concentrations in the reaction appear low and the catalyst productivity appears low as well.

*Effect of Co-catalyst System on Alpha-olefin Polymerization with rac- and meso-dimethylsilylenebis(2,3,5-trimethyl cyclopentadienyl)zirconium dichloride*, Macromol. Rapid. Commun. 18, 581-589 (1997) discloses polymerizations of propylene, hexene, and butene with a rac/meso blend of dimethylsilylbis(2,3,5-trimethyl cyclopentadienyl)zirconium dichloride, (57%-rac, 43%-meso) combined with triphenylcarbenium tetrakis(pentafluorophenyl)borate with triethylaluminum or tri-isobutyl aluminum at 40° C. Propylene polymers having an Mw ranging from about 52,000 to about 267,000 were reported. Similarly butene polymers having an Mw ranging from about 42,000 to about 64,000 were reported. Likewise, hexene polymers having an Mw ranging from about 4,480 to about 4040 were reported. For the polymerizations the molar ratio of Al/Zr was reported as 250:1 for the trialkyl aluminum and as 1:1 for the activator to zirconium molar ratio. No hydrogen is reported as added to the polymerizations. The polymer products appear to be solid at room temperature.

Meso metallocenes have also been used to make higher molecular weight polymers. See US20040225088 A1 and U.S. Pat. No. 5,852,143.

Other references of interest include: EP0284708, U.S. Pat. No. 5,846,896, U.S. Pat. No. 5,679,812, EP0321852, U.S. Pat. No. 4,962,262 EP0513380, US2004/0230016, and U.S. Pat. No. 6,642,169.

US 2007/0043248 discloses preparation of poly-alpha-olefins from C3 to C24 monomers using an unbridged substituted bis cyclopentadienyl transition metal compound, with a non-coordinating anion and optional aluminum alkyl in the presence of 0.1 to 50 psi hydrogen and where, inter alia, the temperature in the reaction zone does not rise by more than 10° C. Such unbridged substituted bis cyclopentadienyl transition metal compounds are not meso transition metal compounds.

WO/2007/011832 discloses a process comprising contacting a metallocene compound, an activator, optionally a co-activator, and a feed having an average carbon number of at least 4.1 and comprising at least two different alpha-olefin monomers selected from C3 to C30 alpha-olefins under conditions suitable to obtain an essentially random liquid polymer comprising said at least two feed alpha-olefins, with the proviso that any one of ethylene and propylene, if present in said feed, is present in the amount of less than 50 wt % individually, preferably in the amount of less than 50 wt % combined, based on the combined weight of alpha-olefins in said feed.

WO 2007/011459 discloses various metallocenes used in combination with non-coordinating anions to make poly-alpha-olefins have specific microstructures. Examples 59 to 62 are stated to demonstrate that using meso type catalysts with no hydrogen produces fluids with lower degree of mm triads (e.g. less than 40%) and bromine number of up to 6 before hydrogenation. Example 60 produced a poly-alpha-olefin having a VI of 380 and a KV100 of 3758 using meso-ethylenebis(indenyl)zirconium dichloride in combination with N,N-dimethylanilinium tetra(pentafluorophenyl)borate and tri-isobutylaluminum at 50° C. with no hydrogen present.

SUMMARY OF THE INVENTION

The present invention pertains to a process to produce a liquid poly-alpha-olefin comprising:

a) contacting in a reaction zone, in the presence of from 0 to 60 psi (0 to 414 kPa) hydrogen (e.g. a 0 to 60 psi partial pressure, based upon total of the gases present in the reactor for a gas phase process or in the head space that are in equilibrium with the reactor contents for a solution, bulk, or slurry phase process), one or more C3 to C20 alpha-olefin monomers with a non-coordinating anion activator, a single bridged meso-metallocene transition metal compound having less than about 35 wt % racemic isomer, and a co-activator selected from the group consisting of alkyl aluminum compounds and alkyl alumoxanes, provided that when the alkyl alumoxane is present in a molar ratio of less than 0.1:1 of alkylalumoxane to meso-metallocene, and provided that when the alkyl aluminum compound is present at a molar ratio of alkyl aluminum to meso-metallocene of from 2:1 to 10,000 to 1, where the molar ratio of activator to meso-metallocene is from 10:1 to 0.1:1, and provided that ethylene is not present at more than 30 volume % of the monomers entering the reaction zone, provided that the alpha-olefin monomers in the feed components are present in at least 20 wt % or more based upon the weight of the meso-metallocene, non-coordinating anion activator, co-activator, monomers, solvent or diluent, and product, and where:

i) the productivity of the process is at least 50,000 g of total product per gram of transition metal compound (where the total product is defined to be the total amount of product exiting the reactor, minus unreacted monomers and solvents); and ii) no more than 5% monomer is converted from olefin to alkane; and b) obtaining a liquid polyalphaolefin product having a pour point of less than 25° C., a $KV_{100}$ of 2 to 6000 cSt, 20 weight percent dimer or less and a viscosity index of 60 or more.

The invention further pertains to the polyalphaolefins prepared by the processes described herein.

DETAILED DESCRIPTION OF THE INVENTION

As used herein, the new numbering scheme for the Periodic Table of the Elements is used as set out in CHEMICAL AND ENGINEERING NEWS, 63(5), 27 (1985).

Unless otherwise stated all pressures in psi are psig. (psi× 6.894757=kPa)

For purposes of this invention and the claims thereto, when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers, where copolymers include any polymer having two or more chemically distinct monomers. Likewise the use of the term oligomer is meant to encompass homooligomers and cooligomers, where cooligomers include any oligomer or having two or more chemically distinct monomers.

For purposes of this invention and the claims thereto, a liquid is defined to have a pour point of less than 25° C.

For purposes of this invention and the claims thereto, an oligomer is defined to have a number-average molecular weight ($M_n$) of less than 20 kg/mol. Preferred oligomers have an Mn of less than 15 kg/mol, preferably less than 13 kg/mol, preferably less than 10 kg/mol, preferably less than 5 kg/mol, preferably less than 4 kg/mol, preferably less than 3 kg/mol, preferably less than 2 kg/mol, preferably less than 1 kg/mol.

For the purposes of this invention and the claims thereto the term "Polyalpha-olefin," "polyalphaolefin," or "PAO" includes homooligomers, cooligomers, homopolymers and copolymers of C3 or greater alpha-olefin monomers.

The PAO's of the present invention can include oligomers, polymers or combinations of both. The PAO compositions (whether it be oligomers, polymers or combinations thereof) of the present invention are liquids and have an $M_w$ of 200,000 or less.

For the purposes of this invention and the claims thereto the active species in a catalytic cycle may comprise the neutral or ionic forms of the catalyst.

The term "catalyst system" is defined to mean a catalyst precursor/activator pair, such as a meso-metallocene/activator pair. When "catalyst system" is used to describe such a pair before activation, it means the unactivated catalyst (precatalyst) together with an activator and, optionally, a co-activator (such as a trialkylaluminum compound). When it is used to describe such a pair after activation, it means the activated catalyst and the activator or other charge-balancing moiety. Additionally, the catalyst system may optionally comprise a co-activator and/or other charge-balancing moiety.

"Catalyst precursor" is also often referred to as precatalyst, catalyst, catalyst compound, precursor, meso-metallocene, transition metal compound, unactivated catalyst, or transition metal complex. These words are used interchangeably. Activator and cocatalyst are also used interchangeably. A scavenger is a compound that is typically added to facilitate oligomerization or polymerization by scavenging impurities. Some scavengers may also act as activators and may be referred to as co-activators. A co-activator which is not a scavenger may also be used in conjunction with an activator in order to form an active catalyst with a transition metal compound. In some embodiments, a co-activator can be pre-mixed with the transition metal compound to form an alkylated transition metal compound, also referred to as an alkylated catalyst compound or alkylated meso-metallocene.

For purposes of this invention and the claims thereto non-coordinating anion (NCA) is defined to mean an anion which either does not coordinate to the catalyst metal cation or that coordinates only weakly to the metal cation. An NCA coordinates weakly enough that a neutral Lewis base, such as an olefinically or acetylenically unsaturated monomer, can displace it from the catalyst center. Any metal or metalloid that can form a compatible, weakly coordinating complex with the catalyst metal cation may be used or contained in the noncoordinating anion. Suitable metals include, but are not limited to, aluminum, gold, and platinum. Suitable metalloids include, but are not limited to, boron, aluminum, phosphorus, and silicon. A subclass of non-coordinating anions comprises stoichiometric activators, which can be either neutral or ionic. The terms ionic activator, and stoichiometric ionic activator can be used interchangeably. Likewise, the terms neutral stoichiometric activator and Lewis acid activator can be used interchangeably.

In addition, a reactor is any container(s) in which a chemical reaction occurs.

For purposes of this invention and the claims thereto, a reaction zone is defined to be a 5 ml vial useful in high throughput experiments through to commercial sized reactors of about 10,000 gallons (37,850 liters) or even larger.

For purposes of this invention and the claims thereto, fractionated product is defined to be that portion of the total product that has greater than 18 carbons. By converted from alkene to alkane is meant that essentially all double bonds in an alkene are converted to single bonds by hydrogenation known as hydrofinishing. The degree of hydrogenation can be measured by bromine number (ASTM D1159). Usually, it is desirable to have a hydrofinished lube with a bromine number of less than 3, or more preferably less than 2, or less than 1 or less than 0.5. Therefore, the term "essentially" relates to a bromine number of less than 3, less than 2, less than 1 or less than 0.5. Generally, the lower the bromine number, the higher the degree of hydrogenation and the better the oxidative stability.

"Isoalkyl" is a branched alkyl group or radical having at least one tertiary or quaternary carbon atom and which possess at least one $C_1$ to $C_{18}$ alkyl branch along at least a portion of each chain.

Polyalpha-Olefins

In a preferred embodiment, this invention relates to liquid polyalpha-olefins (PAO's) comprising more than 50 mole % of one or more C3 to C24 alpha-olefin monomers preferably 55 mole % or more, preferably 60 mole % or more, preferably 65 mole % or more, preferably 70 mole % or more, preferably 75 mole % or more, preferably 80 mole % or more, preferably 85 mole % or more, preferably 90 mole % or more, preferably 95 mole % or more, preferably 100 mole % based on the total moles of monomers present in the polyalpha-olefin, as measured by carbon—13 NMR.

In another embodiment, any of the polyalpha-olefins described herein preferably have less than 300 ppm of Ti, Hf, and/or Zr, preferably less than 200 ppm, preferably less than 100 ppm, preferably less than 50 ppm, preferably less than 10 ppm, or preferably less than 5 ppm, as measured by ASTM D 5185.

In another embodiment, any of the polyalpha-olefins described herein preferably have less than 100 ppm of Group 13 metals (preferably B or Al), preferably less than 50 ppm, preferably less than 10 ppm, or preferably less than 5 ppm as measured by ASTM D 5185.

In another embodiment, any of the polyalpha-olefins described herein preferably have less than 100 ppm of boron, preferably less than 50 ppm, preferably less than 10 ppm, or preferably less than 5 ppm as measured by ASTM D 5185

In another embodiment, any of the polyalpha-olefins described herein preferably have less than 600 ppm of aluminum, preferably less than 500 ppm, preferably less than 400 ppm, preferably less than 300 ppm, preferably less than 200 ppm, preferably less than 100 ppm, preferably less than 50 ppm, preferably less than 10 ppm, or preferably less than 5 ppm as measured by ASTM D 5185.

In another embodiment, any of the polyalpha-olefins described herein preferably have an $M_w$ (weight average molecular weight) of about 200,000 or less, preferably between about 250 and about 200,000, preferably between about 280 and about 100,000, preferably between about 336 to about 150,000, and preferably between about 336 and about 100,000 g/mol.

In another embodiment, any of the polyalpha-olefins described herein preferably have an $M_n$ (number average molecular weight) of less than 200,000 preferably between 250 and about 150,000, preferably between about 250 and about 125,000 and preferably between 280 and 100,000 g/mol In another embodiment, any of the polyalpha-olefins described herein preferably have an $M_w/M_n$ of greater than 1 and less than 5, preferably less than 4, preferably less than 3, preferably less than 2.5, preferably less than 2. Alternatively, any of the polyalpha-olefins described herein preferably have an $M_w/M_n$ of between 1 and 3.5, alternatively between 1 and 2.5

In one embodiment, the finished polyalphaolefin has an unimodal Mw/Mn molecular weight distribution determined by size exclusion or gel permeation chromatograph. In another embodiment, the final polyalphaolefin has a multimodal molecular weight distribution, where the MWD can be greater than 5. In another aspect, the finished polyalphaolefin has a shoulder peak either before or after, or both before and after the major unimodal distribution. In this case, the MWD can be broad (>5) or narrow (<5 or <3 or <2), depending on the amount and size of the shoulder.

For purposes of this invention and the claims herein, MWD is equal to $M_w/M_n$.

For many applications when superior shear stability, thermal stability or thermal/oxidative stability is preferred, it is preferable to have the polyalpha-olefins made with the narrowest possible MWD. PAO fluids with different viscosities, but made from the same feeds or catalysts, usually have different MWDs. In other words, MWDs of PAO fluids are dependent on fluid viscosity. Usually, lower viscosity fluids have narrower MWDs (smaller MWD value) and higher viscosity fluids have broader MWDs (larger MWD value). For most fluids with 100° C. Kv of less than 1000 cSt, the MWD of is usually less than 2.5, and typically around 2.0±0.5. For fluids with 100° C. viscosity greater than 1000 cSt, they usually have broader MWDs, usually greater than 1.8.

Usually, the narrower a fluid's MWD, the better its shear stability. Such narrow MWD fluids will exhibit less viscosity loss due to high stress or shear in the TRB test (CEC-L-45-T/C) or in a sonic shear test (ASTM 2603), and will have higher high-temperature, high-shear rate (HTHSR) viscosity under more severe conditions, providing a thicker lubricant film and concomitantly better lubrication and wear protection. In certain applications, when shear stability or HTHSR viscosity is not so critical, fluids with broader MWD may provide better viscometrics, better blending property, better low temperature properties or other advantages.

The $M_w$, $M_n$ and MWD are measured by size exclusion chromatography (SEC), also known as gel permeation chromatography (GPC) method using a column for medium- to low-molecular weight polymers, with tetrahydrofuran as solvent and polystyrene as calibration standard and at room temperature. Unless otherwise indicated, the Mn and Mw values reported herein are measured GPC values and not calculated from kinematic viscosity at 100° C.

In a preferred embodiment of this invention, any PAO described herein may have a pour point of less than 25° C. (as measured by ASTM D 97), preferably less than 0° C., preferably less than –10° C., preferably less than –20° C., preferably less than –25° C., preferably less than –30° C., preferably less than –35° C., preferably less than –40° C., preferably less than –55° C., preferably between –10 and –80° C., preferably between –15° C. and –70° C.

Peak melting point ($T_m$), crystallization temperature (Tc), heat of fusion and degree of crystallinity (also referred to as % crystallinity) were determined using the following procedure. Differential scanning calorimetric (DSC) data was obtained using a TA Instruments model 2920 machine. Samples weighing approximately 7-10 mg were sealed in aluminum sample pans. The DSC data was recorded by first cooling the sample to –100° C. and then gradually heating it to 30° C. at a rate of 10° C./minute. The sample is kept at 30° C. for 5 minutes before a second cooling-heating cycle is applied. Both the first and second cycle thermal events are recorded. Areas under the curves were measured and used to determine the heat of fusion and the degree of crystallinity. A value of 189 J/g was used as the heat of fusion for 100% crystalline polypropylene. (The percent crystallinity is calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. The melting temperatures reported here are the peak melting temperatures from the second melt unless otherwise indicated. For samples displaying multi-peak melting characteristics, the higher melting peak was taken as the principal melting point.

The polyalphaolefins of the invention have a $T_m$ of 0° C. or less, and preferably have no measurable Tm. "No measurable Tm" is defined to be when there is no clear melting as observed by heat absorption in the DSC heating cycle measurement. Usually the amount of heat absorption is less than 20 J/g. It is preferred to have the heat release of less than 10 J/g, preferred less than 5 J/g, more preferred less than 1 J/g. Usually, it is preferred to have lower melting temperature, preferably below 0° C., more preferably below –10° C., more preferably below –20° C., more preferably below –30° C., more preferably below –40° C., most preferably no clear melting peak in DSC.

In one aspect, the polyalphaolefin is preferred to have no appreciable cold crystallization in DSC measurement. During the heating cycle for the DSC method as described above, the PAO may crystallize if it has any crystallizable fraction. This cold crystallization can be observed on the DSC curve as a distinct region of heat release. The extent of the crystallization can be measured by the amount of heat release. Higher amount of heat release at lower temperature means higher degree of poor low temperature product. The cold crystallization is usually less desirable, as it may mean that the fluid may have very poor low temperature properties—not suitable for high performance application. It is preferred to have less than 20 j/g of heat release for this type of cold crystallization, preferred less than 10 j/g, less than 5 j/g and less than 1 j/g, most preferably to have no observable heat release due to cold crystallization during DSC heating cycle. The polyalpha olefins of the invention have no measurable melting point by DSC.

In a preferred embodiment according to the present invention, any polyalpha olefin described herein may have a kinematic viscosity at 100° C. of 2 to about 6000 cSt, preferably from greater than 10 to about 3000 cSt, preferably from greater than 3 cSt to about 1500 cSt. More particularly, poly-alpha olefins described herein may have a kinematic viscosity at 100° C. of from about 3 to about 1000 cSt (e.g., 150, 300 and 600), preferably from about 3.5 to about 1000 cSt, preferably from about 25 cSt to about 650 cSt, or preferably from 6 to 300 cSt, or preferably from 10 to 1500 cSt, or preferably from 20 to 1000 cSt, or preferably from 100 to 1500 cSt, or preferably from 150 to 1500 cSt, or preferably from 300 to 3000 cSt.

In a another embodiment of this invention, any PAO described herein may have a kinematic viscosity at 40° C. as measured by ASTM D 445 from about 4 to about 300,000 cSt, preferably from about 6 to about 200,000 cSt, preferably from about 6 cSt to about 100,000 cSt, or preferably from 10 to 65,000 cSt, or preferably from 30 to 150,000 cSt, or preferably from 60 to 100,000 cSt, or preferably from 300 to 15,000 cSt, or preferably from 450 to 150,000 cSt, or preferably from 600 to 150,000 cSt at 40° C.

In a preferred embodiment according to the present invention, the polyalpha-olefin fluid described herein may have a viscosity index (VI) of greater than 60, preferably 100, more preferably 120, preferably 150 and more preferably 200. VI is determined according to ASTM Method D 2270-93 [1998]. VI of a fluid is usually dependent on the viscosity, feed composition and method of preparation. Higher viscosity fluid of the same feed composition usually has higher VI. The typical VI range for fluids made from $C_3$ or $C_4$ or $C_5$ linear alpha-olefin (LAO) by the method described herein are from 65 to 250. Typical VI range for fluids made from $C_6$ or $C_7$ are from 100 to 300, again depending on fluid viscosity. Typical VI range for fluids made from $C_8$ to $C_{14}$ LAO, such as 1-octene, 1-nonene, 1-decene or 1-undecene or 1-dodecene, 1-tetra-decene, are from 120 to >450, depending on viscosity. More specifically, the VI range for fluids made from 1-decene or 1-decene equivalent feeds are from about 100 to about 500, preferably from about 120 to about 400. When two or three or more alpha-olefins were used as feeds, such as combination of $C_3+C_{10}$, $C_3+C_{14}$, $C_3+C_{16}$, $C_3+Cl_8$, $C_4+C_8$, $C_4+Cl_2$, $C_4+C_{16}$, $C_3+C_4+C_8$, $C_3+C_4+C_{12}$, $C_4+C_{10}+Cl_2$, $C_4+C_{10}+C_{14}$, $C_6+C_{12}$, $C_6+C_{12}+C_{14}$, $C_4+C_6+C_{10}+C_{14}$, $C_4+C_6+C_8+C_{10}+C_{12}+C_{14}+C_{16}+C_{18}$, etc. The product VI depends on the fluid viscosity and also on the choice of feed olefin composition. For the most demanding lubricant applications, it is better to use fluids with higher VI.

In another embodiment, it is preferable that the PAO fluid does not contain a significant amount of very light fraction. These light fractions contribute to high volatility, unstable viscosity, poor oxidative and thermal stability. They are usually removed in the final product. It is generally preferable to have less than 5 wt % fluid with C20 or lower carbon numbers, more preferably less than 10 wt % fluid with C24 or lower carbon numbers or more preferably less than 15 wt % fluid with C26 or lower carbon numbers. It is preferable to have less than 3 wt % fluid with C20 or lower carbon numbers, more preferably less than 5 wt % fluid with C24 or lower carbon numbers or more preferably less than 8 wt % fluid with C26 or lower carbon numbers. It is preferable to have less than 2 wt % fluid with C20 or lower carbon numbers, more preferably less than 3 wt % fluid with C24 or lower carbon numbers or more preferably less than 5 wt % fluid with C26 or lower carbon numbers. Also, the lower the amount of any of these light hydrocarbons, the better the fluid property as can be determined by Noack volatility testing (ASTM D5800). Usually, the Noack volatility is a strong function of fluid viscosity. Lower viscosity fluid usually has higher volatility and higher vis fluid has lower volatility. Preferably, the PAO fluid has a Noack volatility of less than 30 wt %, preferably less than 25 wt %, preferably less than 10 wt %, preferably less than 5 wt %, preferably less than 1 wt %, and preferably less than 0.5 wt %. PAO's that have a $K_v100$ of between about 3 and about 20 have Noack volatilities of 30 wt %, preferably less than 25 wt %, preferably less than 10 wt %, preferably less than 5 wt %, preferably less than 1 wt %, and preferably less than 0.5 wt %. PAO's that have a $K_v100$ of greater than 40 have Noack volatilities of less than 5 wt %, preferably less than 4 wt %, preferably less than 3 wt %, preferably less than 2 wt %, preferably less than 1 wt %, and preferably less than 0.5 wt %.

In another embodiment any polyalpha olefin described herein may have a kinematic viscosity ($K_v$) at 100° C. from 2 to 6000 cSt and a flash point of 150° C. or more, preferably 200° C., as measured by ASTM D 56.

In another embodiment, the polyalpha olefin described herein can have $K_v$ at 100° C. of 4, 5, 6, 7, 8, etc. through 6,000, inclusive including non-integer values such as 3.5, 7.5, 10.5, etc.

In another embodiment any polyalpha olefin described herein may have a dielectric constant of 3 or less, usually 2.5 or less (1 kHz at 23° C. as determined by ASTM D 924).

In another embodiment any polyalpha olefin described herein may have a specific gravity of 0.6 to 0.9 g/cm³, preferably 0.7 to 0.88 g/cm³.

The PAO's prepared herein, particularly those of moderate to high viscosity (such as those with a $KV_{100}$ of 3 cSt or greater), are especially suitable for use in the formulation of high performance automotive engine oils, general industrial lubricants, grease, various types of automotive or industrial gears oils, aviation lubricants, hydraulic fluids or lubricants, heat transfer fluids, insulating fluids, etc. They can be used by themselves or by blending with other fluids in 0.1 wt % up to 95 wt %, such as Group I, II, Group II+, Group III, Group III+base stocks or lube base stocks derived from hydroisomerization of wax fractions from Fischer-Tropsch hydrocarbon synthesis from CO/H$_2$ syn gas, or other Group IV PAO base stocks or Group V or Group VI base stocks. These blend stocks, when combined with additives, are used to formulated full synthetic lubricants, partial synthetics, or used as special additive components with other base stocks.

All kinematic viscosity values reported for fluids herein are measured at 100° C. unless otherwise noted. Dynamic viscosity can then be obtained by multiplying the measured kinematic viscosity by the density of the liquid. The units for kinematic viscosity are in m²/s, commonly converted to cSt or centistokes (1 cSt=$10^{-6}$ m²/s or 1 cSt=1 mm²/sec).

The PAO's produced according to this invention are typically dimers, trimers, tetramers, or higher oligomers of one or more $C_3$ to $C_{24}$ olefin monomers, preferably one or more $C_4$ to $C_{20}$ alpha-olefin monomers, preferably one or more $C_5$ to $C_{20}$ linear alpha-olefin monomers. Alternatively, an alpha-olefin with an alkyl or phenyl substituent at least 2 carbons away from the olefinic double bond can also be used. Typically, the PAO's produced herein are usually a mixture of many different oligomers. In one embodiment, the smallest oligomers from these alpha-olefins have carbon numbers ranging from $C_6$ to $C_{40}$. These small oligomers are usually separated from the higher oligomers with carbon number of greater than $C_{20}$, or preferably greater than $C_{22}$, or preferably greater than $C_{24}$, or preferably greater than $C_{26}$, or preferably greater than $C_{28}$, or preferably greater than $C_{30}$, or preferably greater than $C_{32}$. Typically, for example, $C_{24}$ and higher which are typically used as high performance fluids. These separated lower oligomer olefins or the corresponding paraffins after hydrogenation can be used in specialty applications, such as drilling fluids, solvents, paint thinner, etc with excellent biodegradability, toxicity, viscosities, etc. Sometimes, the smaller oligomers up to $C_{40}$ are separated from the residual lube fraction to give products with most desirable properties. The high performance fluid fraction in the $C_{20}$, or $C_{30}$ and higher fractions typically have lower viscosities making them beneficial for some applications, such as engine lubricants with better fuel economy, better biodegradability, better low temperature flow properties, or lower volatility.

In this invention, the oligomerization or polymerization process is typically carried out in such a manner to produce a final product with 100° C. Kv of greater than 2 cSt or preferably greater than 3 cSt. The process and catalyst employed to produce these fluids are unique that they produce polymers with narrow molecular weight distribution. Because of this feature, the polymerization process produces very high selectivity to lube fraction product with very low amount of light fraction of $C_{20}$ or $C_{24}$ or $C_{28}$ or $C_{30}$ or lower fractions, depending on feed types. Furthermore, because of this narrow distribution, the final lube fraction does not contain an excessive high molecular weight fraction, which may contribute to the instability under shear, thermal, oxidative stress, etc.

The PAOs described herein can be further blended with other base stocks (Gr I to VI) and additives, including anti-oxidants, antiwear additives, friction modifiers, dispersants, detergents, corrosion inhibitors, defoamants, extreme pressure additives, seal swell additives, and optionally viscosity modifiers, etc. Description of typical additives, formulation and application can be found in the book "Synthetics, Mineral Oils, and Bio-Based Lubricants, Chemistry and Technology", Ed. L. R. Rudnick, CRC Press, Taylor & Francis Group, Boca Raton, Fla. and in "Lubricant Additives" Chemistry and Applications, ed. L. R. Rudnick, Marcel Dekker, Inc., New York, 2003.

In another embodiment, the PAO's produced directly from the oligomerization or polymerization process are unsaturated olefins. The amount of unsaturation can be quantitatively measured by bromine number measurement according to the ASTM D 1159, or by proton or carbon-13 NMR. Proton NMR spectroscopic analysis can also differentiate and quantify the types of olefinic unsaturation: vinylidene, 1,2-disubstituted, trisubstituted, or vinyl. Carbon-13 NMR spectroscopy can confirm the olefin distribution calculated from the proton spectrum.

Both proton and carbon-13 NMR spectroscopy can quantify the extent of short chain branching (SCB) in the olefin oligomer, although carbon-13 NMR can provide greater specificity with respect to branch lengths. In the proton spectrum, the SCB branch methyl resonances fall in the 1.05-0.7 ppm range. SCBs of sufficiently different length will give methyl peaks that are distinct enough to be integrated separately or deconvoluted to provide a branch length distribution. The remaining methylene and methine signals resonate in the 3.0-1.05 ppm range. In order to relate the integrals to CH, $CH_2$, and $CH_3$ concentrations, each integral must be corrected for the proton multiplicity. The methyl integral is divided by three to derive the number of methyl groups; the remaining aliphatic integral is assumed to comprise one CH signal for each methyl group, with the remaining integral as $CH_2$ signal. The ratio of $CH_3/(CH+CH_2+CH_3)$ gives the methyl group concentration.

Similar logic applies to the carbon-13 NMR analysis, with the exception that no proton multiplicity corrections need be made. Furthermore, the enhanced spectral/structural resolution of $^{13}C$ NMR vis a vis $^{1}H$ NMR allows differentiation of ions according to branch lengths. Typically, the methyl resonances can be integrated separately to give branch concentrations for methyls (20.5-15 ppm), propyls (15-14.3 ppm), butyl-and-longer branches (14.3-13.9 ppm), and ethyls (13.9-7 ppm).

Olefin analysis is readily performed by proton NMR, with the olefinic signal between 5.9 and 4.7 ppm subdivided according to the alkyl substitution pattern of the olefin. Vinyl group CH protons resonate between 5.9-5.7 ppm, and the vinyl $CH_2$ protons between 5.3 and 4.85 ppm. 1,2-disubstituted olefinic protons resonate in the 5.5-5.3 ppm range. The trisubstituted olefin peaks overlap the vinyl $CH_2$ peaks in the 5.3-4.85 ppm region; the vinyl contributions to this region are removed by subtraction based on twice the vinyl CH integral. The 1,1-disubstituted- or vinylidene-olefins resonate in the 4.85-4.6 ppm region. The olefinic resonances, once corrected for the proton multiplicities can be normalized to give a mole-percentage olefin distribution, or compared to the multiplicity-corrected aliphatic region (as was described above for the methyl analysis) to give fractional concentrations (e.g. olefins per 100 carbons).

Generally, the amount of unsaturation strongly depends on the fluid viscosity or fluid molecular weight. Lower viscosity fluid has higher degree of unsaturation and higher bromine number. Higher viscosity fluid has lower degree of unsaturation and lower bromine number. If a large amount of hydrogen or high hydrogen pressure is applied during the polymerization step, the bromine number maybe lower than without the hydrogen presence. Typically, for greater than 2 to 6000 cSt polyalpha-olefin produced from 1-decene or other LAOs in this inventive process, the as-synthesized PAO will have bromine number of from 60 to less than 1, preferably from about 30 to about 0.01, preferably from about 10 to about 0.5, depending on fluid viscosity.

The types of olefinic unsaturations in the PAO fluids produced by this inventive process are unique, as confirmed by $^{1}H$ and $^{13}C$-NMR. They contain a very high amount of vinylidene olefins, $CH_2=CR^1R^2$, and di-substituted olefins. In the present invention, the vinylidene and disubstituted olefin content is more than 65 mole %, or more than 70% or more than 80%. These disubstituted olefins are usually more desirable because these types of olefins are much more reactive for further hydrogenation or for further functionalization. They are much more readily hydrogenated to give fully saturated hydrocarbons for high performance base stocks. Usually, the degree of hydrogenation affects the oxidative stability of the fluid. Fluids with a higher degree of hydrogenation, and concomitantly lower bromine number, usually have better oxidative stability. The PAO in the present invention has high vinylidene and disubstituted olefin content and is therefore more amenable to hydrogenation, to provide the formation of low bromine number fluids. The bromine number after hydrogenation is preferably less than 5, more preferably less than 3, more preferably less than 2, more preferably less than 1, more preferably less than 0.5, more preferably less than 0.1. Generally, the lower the bromine number, the better the oxidative stability.

In a preferred embodiment, the PAO produced in this invention contains a substantial amount of atactic polymer structure. In other words, the PAO have mostly atactic arrangements of the monomer units along the polymer chain. This atactic polymer is beneficial for the lubricant applications. In a preferred embodiment, the PAO produced by this invention has an atatic polymer structure of at least 50%, preferably at least 75%, preferably at least 85%, preferably at least 90%, preferably at least 95%, preferably at least 99% as determined by carbon-13 NMR described below.

In another embodiment this invention further relates to PAO's having 90 mole % or less of mm triads, preferably 80 mole % or less, preferably 70 mole % or less, preferably 60 mole % or less, preferably 50 mole % or less, preferably 40 mole % or less, preferably 30 mole % or less, preferably 20 mole % or less, preferably 10 mole % or less, preferably 5 mole % or less as determined by Carbon-13 Nuclear Magnetic Resonance (NMR) spectroscopy according to the procedure below.

In another embodiment this invention further relates to PAO's having 20 mole % or less of rr triads, preferably 10 mole % or less, preferably 5 mole % or less as determined by Carbon-13 Nuclear Magnetic Resonance ($^{13}$CNMR) spectroscopy according to the procedure below.

In another embodiment this invention further relates to PAO's having 20 mole % or more of mr triads, preferably 30 mole % or more, preferably 40 mole % or more, preferably 50 mole % or more, preferably 55 mole % or more, preferably 60 mole % or more as determined by $^{13}$CNMR spectroscopy according to the procedure below. In another embodiment this invention further relates to PAO's having the ratio of mm/mr of less than 5, preferably less than 4, preferably less than 3, preferably less than 2, preferably less than 1, as determined by $^{13}$C spectroscopy according to the procedure below.

As noted above, Carbon-13 NMR is used to determine tacticity of the polyalphaolefins of the present invention—quantitatively in some cases, and qualitatively in others. Carbon-13 NMR can be used to determine the concentration of the triads, denoted mm (meso, meso), mr (meso, racemic) and rr (racemic, racemic), as well as molar composition of the sample. The concentrations of these triads defines whether the polymer is isotactic, atactic or syndiotactic. Spectra for a PAO sample are acquired in the following manner. Approximately 100-1000 mg of the PAO sample is dissolved in 2-3 ml of chloroform-d for Carbon 13 analysis. Approximately 10 mg/ml (solvent basis) of chromium acetylacetonate relaxation agent, Cr(acac)3, is added to the sample to enhance the data acquisition rate. Analysis of the spectra is performed according to the paper by Kim, I.; Zhou, J.-M.; and Chung, H. *Journal of Polymer Science: Part A: Polymer Chemistry* 2000, 38 1687-1697, augmented by the identification and integration of end group resonances, and removal of their contributions to the peaks used in the analysis. The deconvolutions are executed with Acorn NMR Inc.'s NutsPro NMR data analysis software, using an 85/15 Lorentzian/Gaussian lineshape. The component peaks are lumped together into clusters according to the mm, mr, and rr triad assignments, and fit with a Bernoullian distribution. The adjustable parameter for these fits is Pr, the fraction of monomer added with racemic stereochemistry. For details of going from a set of triad measurements (such as described by Kim above) to a statistical model (such as the Bernoullian) see "Polymer Sequence Determination, James C. Randall, Academic Press, New York, 1977". For examples of measurements of tacticity of polydecene and polydodecene please see the examples section of PCT patent application PCT/US2006/021231, filed Jun. 2, 2006.

In another embodiment of this invention, 1,2 disubstituted olefins are present in the polyalpha-olefin product at more than Z mole %, where Z=8.420*Log(V)–4.048 where V is the kinematic viscosity of the polyalpha-olefin in cSt measured at 100° C., preferably at 7 mole % or more, preferably at 5 mole % or more. For information on how to measure 1,2 disubstituted olefin content, please see PCT/US06/21231 filed Jun. 2, 2006. In another embodiment of this invention, 1,2 disubstituted olefins are present in the polyalpha-olefin product at less than Z mole %, where Z=8.420*Log(V)–4.048 where V is the kinematic viscosity of the polyalpha-olefin in cSt measured at 100° C., preferably at 7 mole % or less, preferably at 5 mole % or less. For information on how to measure 1,2 disubstituted olefin content, please see PCT/US06/21231 filed Jun. 2, 2006.

In another embodiment, the saturated polyalpha-olefin has more than Z mole % of units represented by the formula:

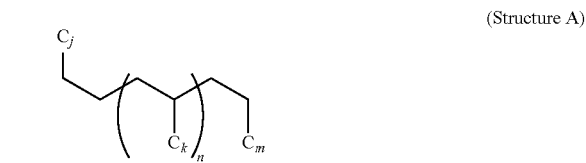

(Structure A)

where j, k and m are each, independently, 3, 4, 5, 6, 7, 8, 9, 10, 11, 12, 13, 14, 15, 16, 17, 18, 19, 20, 21, or 22, n is an integer from 1 to 350, and where Z=8.420*Log(V)–4.048, where V is the kinematic viscosity of the polyalpha-olefin measured at 100° C. in cSt.

In a preferred embodiment, the product produced herein has a selectivity of 70% or more for $C_{20}$ and greater hydrocarbons, preferably 80% or more, preferably 90% or more, more preferably 95% or more, preferably 98% or more, preferably 99% or more for $C_{20}$ and greater hydrocarbons.

Process

This invention relates to an improved process to produce liquid poly-alpha-olefins. This improved process employs meso-metallocene catalysts having less than about 35% by weight racemic isomer together with one or more non-coordinating anion activators, in the presence of from 0 to 60 psi (0 to 414 kPa) hydrogen (e.g. a 0 to 60 psi partial pressure, based upon total of the gases present in the reactor for a gas phase process or in the head space that are in equilibrium with the reactor contents for a solution, bulk, or slurry phase process), and a co-activator selected from the group consisting of alkyl aluminum compounds and optionally alkyl alumoxanes, provided the alkyl alumoxane is present in a molar ratio of less than 0.1:1 of alkylalumoxane to meso-metallocene, and provided the alkyl aluminum compound is present at a molar ratio of alkyl aluminum to meso-metallocene of from 2:1 to 10,000 to 1, where the molar ratio of activator to meso-metallocene is from 10:1 to 0.1:1. The meso-metallocene catalysts are bridged, substituted or unsubstituted bis(cyclopentadienyl) transition metal compounds. The meso-metallocenes can be singly or doubly bridged.

One preferred class of catalysts comprises highly substituted meso-metallocenes that give high catalyst productivity and with product kinematic viscosities of 3 cSt to about 6000 cSt as measured at 100° C. One aspect of the processes described herein also includes treatment of the feed olefins and solvents (if used), or purging nitrogen gas stream to remove catalyst poisons, such as peroxides, oxygen-, sulfur-, and nitrogen-containing organic compounds, and or acetylenic compounds. This treatment is believed to increase catalyst productivity, typically by more than 30% increase in catalyst productivity, or more than 50% increase in catalyst productivity, or more than 100% increase in catalyst productivity, or more than 200% increase in catalyst productivity, or more than 500% increase in catalyst productivity, or more than 1000% increase in catalyst productivity, or more than 2000% increase in catalyst productivity. In many cases, without purification of feed olefins, solvents if used, or purging gas stream, one would obtain no conversion or very low conversion, (e.g. less than 5%).

In a preferred embodiment, this invention relates to a process (preferably a continuous or semi-continuous or batch process) to produce a liquid polyalpha-olefin comprising:

a) contacting in a reaction zone, optionally in the presence of 0 to 60 psi (0 to 414 kPa) hydrogen (e.g. a 0 to 60 psi partial pressure, based upon total of the gases present in the reactor for a gas phase process or in the head space that are in equilibrium with the reactor contents for a solution, bulk, or slurry phase process), one or more C3 to C20 alpha-olefin monomers with a non-coordinating anion activator, a single bridged meso-metallocene transition metal compound having less than about 35 wt % racemic isomer, and a co-activator selected from the group consisting of alkyl aluminum compounds and optionally alkyl alumoxanes, provided that when the alkyl alumoxane is present in a molar ratio of less than 0.1:1 of alkylalumoxane to meso-metallocene, and provided that when the alkyl aluminum compound is present at a molar ratio of alkyl aluminum to meso-metallocene of from 2:1 to 10,000 to 1, where the molar ratio of activator to meso-metallocene is from 10:1 to 0.1:1, and provided that ethylene is not present at more than 30 volume % of the monomers entering the reaction zone, provided that the alpha-olefin monomers in the feed components are present in at least 20 wt % or more (alternately 25 wt % or more, alternately 30 wt % or more) based upon the weight of the meso-metallocene, non-coordinating anion activator, co-activator, monomers, and solvent or diluent, and where:

i) the productivity of the process is at least 50,000 g of fractionated product per gram of transition metal compound (where the total product is defined to be the total amount of product exiting the reactor, minus unreacted monomers and solvents);

ii) no more than 5% monomer is converted from olefin to alkane; and b) obtaining a liquid polyalphaolefin product having 20 weight percent dimer or less, a pour point of less than 25° C., a $KV_{100}$ of 2 to 6000 cSt or 3 to 6000 cSt and a viscosity index of 60 or more.

The amount of alpha-olefin monomers in the feed components and the volume % of ethylene in the monomers entering the reactor are determined based upon the weight of the meso-metallocene, non-coordinating anion activator, co-activator, monomers, and solvent or diluent as measured over a one hour period of steady state operation.

In still another aspect, the meso-metallocene comprises the formula:

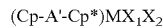

(Cp-A'-Cp*)MX$_1$X$_2$ wherein:

M is the metal center, and is a Group 4 metal preferably titanium, zirconium or hafnium, preferably zirconium or hafnium;

Cp and Cp* are the same or different cyclopentadienyl rings that are each bonded to M, and substituted with from zero to four substituent groups S" being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent S" groups are optionally joined to form a substituted or unsubstituted, saturated, partially unsaturated, or aromatic cyclic or polycyclic substituent;

A' is a bridging group;

X$_1$ and X$_2$ are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or when Lewis-acid activators, such as methylalumoxane, which are capable of donating an X ligand as described above to the transition metal component are used, both X may, independently, be a halogen, alkoxide, aryloxide, amide, phosphide or other univalent anionic ligand or both X can also be joined to form a anionic chelating ligand.

In another aspect, the olefin monomers are present in the reaction system at 20 wt % or more (preferably 30, 40, 50, 60, 70, 80, 85 wt %, or more), based upon the, weight of the reaction system. Reaction system is defined to be the catalyst, activator, coactivator, monomers, solvent or diluent, and product.

In one embodiment, the concentration of the meso-metallocene catalyst compound in the reaction system is 50 micrograms per gram of feed olefin(s) or less, preferably 40, 30, 20, 10, 5 or 1 micrograms of metallocene per gram of feed olefins(s) or less.

The polyolefins produced by the process of the invention should be a substantially atactic polymer with 90 mole % or less of mm triads, preferably 80 mole % or less, preferably 70 mole % or less, preferably 60 mole % or less, preferably 50 mole % or less, preferably 40 mole % or less, preferably 30 mole % or less, preferably 20 mole % or less, preferably 10 mole % or less, as determined by Carbon-13 NMR spectroscopy according to the procedure described above.

By continuous is meant a system that operates without interruption or cessation. For example a continuous process to produce a polymer would be one where the reactants (such as monomers and catalyst components, solvents and/or poison scavengers) are continually introduced into one or more reactors and polymer product is continually withdrawn. By semi-continuous is meant a system that operates with periodic interruption. For example a semi-continuous process to produce a polymer would be one where the reactants (such as monomers and catalyst components and/or scavengers) are continually introduced into one or more reactors and polymer product is intermittently withdrawn. A batch process is not continuous or semi-continuous.

In a preferred embodiment of this invention the reaction temperature is controlled by any of the following means, such as continuous or semi-continuous operation, by heat removal, rate of catalyst or feed addition or solvent addition. Since catalyst solution, feed olefins and/or solvents and/or scavengers are usually added at room or ambient temperature or can be pre-cooled to a desired temperature, their addition to the reactor can mitigate the heat of reaction and can help maintain constant reaction temperature. This mode of operation can control the temperature to within 20° C. of the desired reaction temperature, usually preferably to within 10° C. of the desired temperature, preferably to within 5° C. of the desired temperature, preferably to within 3° C. of the desired temperature, or preferably to within 1° C. of the desired temperature over a 30 minute period, and preferably for the entire reaction.

Usually, a reactor, containing a small amount of starting liquid is pre-heated to within 10° C. of the desired reaction temperature in a semi-continuous run. This starting liquid can be feed olefins, catalyst components, solvents or polyalpha-olefins heels from previous runs, or polyalpha-olefin products from previous runs or any other appropriate liquids. Usually, part of the feed olefins, solvent or PAO heels from previous runs or PAO products from previous runs are a more preferred starting liquid. When the reactor is at a desired temperature, feed olefins, catalyst components, hydrogen of a selected amount, solvents and other components can be added continuously at selected rates. The co-activator(s) or scavenger(s), part of all of or all of the intended amount, can be added to the starting liquid. Or optionally, part or all of the co-activator(s) or scavenger(s) can be added to the feed olefins or solvent streams to maximize the effectiveness. As the polymerization reaction starts at the reaction temperature, heat is released. In order to maintain a reaction temperature to be as constant as possible, heat is removed by one or more of several methods as mentioned in the text, or as generally known in the art. One possible method for heat removal is to continuously circulate a stream of the reactor contents through a heat exchanger by pumping this side stream through a heat exchanger to cool the side stream slightly and then pumping it back into the reaction zone. The rate of this circulation and the degree of cooling of this side stream can be used to effectively control the reaction zone temperature. Alternatively, if the reaction rate is not high enough to maintain the reaction temperature, external heating is supplied to the reactor to maintain a desired temperature. Another method to maintain a constant reaction temperature is by controlling the addition rate of feed olefin or solvent and the temperature of the feed olefin or solvent. After the addition of reactants is completed, the reaction is allowed to proceed for the desired amount of time to obtain highest feed olefin conversion.

In a continuous mode of operation, the operation is similar to the semi-continuous run, except when the reactor is filled up to a pre-determined level, a pre-determined amount of reaction product mixture is withdrawn from the reactor while the addition of all components is continued. The rate of feed addition and the amount of reaction product withdrawn from the reactor determine the reaction time or residence time. This can be pre-determined to obtain high feed olefin conversion and high reactor throughput for economical operation.

In this process, several factors are balanced for optimum results. First is the choice of catalyst components. A meso-metallocene activated by a non-coordinating anion (NCA) with a small amount of trialkylaluminum is an effective catalyst. The meso-metallocene components can be dihalides or dialkyls. But, usually, the dialkyl form of the meso-metallocene is the active chemical component to interact with an NCA activator to give the active catalyst. When the meso-metallocene di-halide is used, it typically requires addition of tri-alkylaluminum or other alkylating reagents to convert the dihalide form into dialkyl form. In this case the molar ratio of tri-alkylaluminum to meso-metallocene is anywhere from 4 to 5000, preferably 8 to 1000. When the meso-metallocene dialkyls are used, such as a meso-ethylenebis(1-indenyl)zirconium dialkyls or meso-dimethylsilylbis(2-methylindenyl) zirconium dialkyls, a small amount of tri-alkylaluminums is used to give the optimum catalyst productivity. In this case the molar ratio of trialkylaluminum to meso-metallocene is typically 2 to 500, preferably 3 to 200, more preferably 3 to 100 or 3 to 10. The amount of NCA used is also important. The molar ratio of meso-metallocene to NCA can ranged from 10 to 0.1. The more preferred molar ratio of meso-metallocene to NCA is close to 1 to 1 or 0.5 to 2.

In addition, the amount of meso-metallocene concentration is important. In order to achieve the highest catalyst productivity, highest selectivity to lube range product and best temperature control and operability, the preferred amount of meso-metallocene per gram of olefin feeds ranges from 0.001 milligram/gram to 1 milligram/gram of olefins. When amounts of catalyst components used are too high, the temperature control can become difficult, product selectivity can suffer and catalyst cost can become un-economical.

The amount of hydrogen present in the reactor is also important. Usually smaller amounts of hydrogen are preferred. The hydrogen head pressure is usually maintained at or below 60 psi (414 kPa), preferably below 50 psi (345 kPa), preferably below 30 psi (207 kPa), preferably below 20 psi (138 kPa), preferably below 10 psi (69 kPa). Alternatively, the amount of hydrogen in the feed composition is present in a concentration of 1 ppm to 30,000 ppm, preferably 5 to 10,000 ppm, preferably, 5 to 1,000 ppm. Usually, this low amount of hydrogen is used to boost catalyst activity. Surprisingly, it has been found that hydrogen present in the reaction medium does not readily hydrogenate the starting alpha-olefin feeds into corresponding alkanes at these levels of hydrogen pressure or hydrogen concentration. In fact, when low levels of hydrogen are present in the reaction mixture, it has been found that the catalyst productivity increases significantly. This is also desirable in that the presence of low levels of hydrogen leads to olefinic polymers with high vinylidene content and substituted olefin content which can later be functionalized by known methods, such as those disclosed in U.S. Pat. No. 6,043,401. Therefore, it is preferred to maintain reactor hydrogen pressure below 60 psi (e.g. a 0 to 60 psi (414 kPa) partial pressure, based upon total of the gases present in the reactor for a gas phase process or in the head space that are in equilibrium with the reactor contents for a solution, bulk, or slurry phase process), more preferably below 40 psi (276 kPa), preferably less than 20 psi (138 kPa), preferably less than 10 psi (69 kPa), preferably less than 5 psi (34 kPa). Low pressure of hydrogen is not only advantageous for producing unsaturated polymers, it is also important to minimize the hydrogenation of feed stock into low value alkanes. Likewise a minimum amount of hydrogen is desired, preferably the hydrogen is present at least 1 psi (7 kPa), preferably at least 5 psi (34 kPa). Usually, it is practical to add 5 to 60 psi (34 to 414 kPa) hydrogen to the reactor.

The reaction time or residence time also influences the extent of conversion of the feed olefins. Usually, longer reaction time or residence time favors higher feed olefin conversion. However, to balance high conversion and the high reactor throughput, the reaction time or residence time is usually between 1 minutes to 30 hours, more preferred 5 minutes to 16 hours, more preferred 10 minutes to 10 hours. This total residence time can be achieved by using a single reactor or a series of cascading or parallel reactors or by controlling the reactant feed rates.

By selective choice of meso-metallocenes, activated with NCA and/or co-activator, and by selective choice of reaction operation conditions, including the amount of catalyst used, and with right amount of trialkylaluminum as co-activator or scavenger, residence time or reaction time, and amount of hydrogen, polyalpha-olefins are produced with high catalyst productivity of more than 1.5 kilogram total product per gram of meso-metallocene used. This high productivity makes the process economically and commercially attractive.

In a preferred embodiment, the productivity of the process is at least 1.5 kg of total product per gram of transition metal compound (TMC), preferably at least 5 kg of total product per gram of TMC, preferably at least 10 kg of total product per gram of TMC, preferably at least 50 kg of total product per gram of TMC, preferably at least 60 kg of total product per gram of TMC, preferably at least 80 kg of total product per gram of TMC, preferably at least 100 kg of total product per gram of TMC. The "total product" is defined to be the total amount of product exiting the reactor, minus unreacted monomers and solvents.

In another preferred embodiment, the productivity of the process is at least 1.5 kg of total product per gram of non-coordinating anion activator compound (NCAAC), preferably at least 5 kg of total product per gram of NCAAC, preferably at least 10 kg of total product per gram of NCAAC, preferably at least 20 kg of total product per gram of NCAAC, preferably at least 50 kg of total product per gram of NCAAC, preferably at least 80 kg of total product per gram of NCAAC, preferably at least 100 kg of total product per gram of NCAAC.

In a preferred embodiment, the productivity of the process is at least 1.5 kg of fractioned product per gram of transition metal compound, preferably at least 5 kg of fractioned product per gram of transition metal compound, preferably at least 10 kg of fractioned product per gram of transition metal compound, preferably at least 20 kg of fractioned product per gram of transition metal compound, preferably at least 40 kg of fractionated product per gram of transition metal compound, preferably at least 65 kg of fractionated product per gram of transition metal compound, preferably at least 80 kg of fractionated product per gram of transition metal compound, preferably at least 100 kg of fractionated product per gram of transition metal compound. As noted above "fractionated product" is defined to be that portion of the total product that has greater than 18 carbons.

It is of interest to have high productivity for the meso-metallocene or non-coordinating anion activator, as these components are usually the more expensive components than other components in the catalyst system.

In a preferred embodiment, the product produced herein has a selectivity of 60% or less for $C_{24}$ or less hydrocarbons, preferably 50% or less, preferably 40% or less, more preferably 20% or less, preferably 10% or less, preferably 5% or less, preferably 1% or less for $C_{24}$ or less hydrocarbons. (% by weight unless otherwise noted).

In a preferred embodiment, the product produced herein has a selectivity of 60% or less for $C_{10}$ dimer (i.e. a C20 product), preferably 50% or less, preferably 40% or less, more preferably 30% or less for $C_{10}$ dimer, preferably 20% or less for $C_{10}$ dimer, more preferably 10% or less for $C_{10}$ dimer, more preferably 5% or less for $C_{10}$ dimer, more preferably 1% or less for $C_{10}$ dimer. (% by weight unless otherwise noted).

In a preferred embodiment, the lube or high-performance fluid produced herein has a selectivity of 10% or more, preferably 20% or more, preferably 40% or more, more preferably 50% or more, preferably 70% or more, preferably 80% or less, preferably 90% or more, or preferably 95% or more, or preferably 99% or more. (% by weight unless otherwise noted).

In a preferred embodiment, the product produced herein has a selectivity of 50% or more for C20 and greater hydrocarbons, preferably 60% or more for C20 and greater hydrocarbons, preferably 70% or more for C20 and greater hydrocarbons, preferably 80% or more, preferably 90% or more, more preferably 95% or more, preferably 98% or more, preferably 99% or more for C20 and greater hydrocarbons.

After the reaction is completed in the semi-continuous run or batch run or the product withdrawn from the continuous run, the crude product usually contains significant amount of catalyst components, including metals and other hetero-atoms from metallocenes, activators and co-activators. These catalyst components usually are removed from the crude product stream before further processing by known procedures. For example, the catalyst components can be deactivated by addition of small amount of oxygen, carbon dioxide, air, water, alcohol, acids or any other catalyst poison agents. Likewise, the product can be washed with dilute aqueous sodium hydroxide or hydrochloric acid solution and water with separation of the organic layer. The organic layer typically contains un-reacted olefins, olefin oligomers and solvent.

Alternatively, the crude polymerization product from the reactor, directly or after deactivated by oxygen, carbon dioxide, air, water or alcohol, acids, etc. can be treated by absorbing the catalyst components and scavenger components and any other heteroatom-containing components using a solid sorbent. This is a preferred method and is used in the examples below. In this method, a catalyst such as air is added to the crude reaction, followed by the addition of a solid absorbent. Or alternatively, a solid absorbent, such as alumina, acid clay, Celite®, powdered cellulose or any known filter aid, is added to the crude product. The slurry is stirred for a pre-determined amount of time, usually greater than 5 minutes. Then the solid is filtered and the filtrate is ready for further distillation or fractionation. This method is described more fully in patent application U.S. Ser. No. 60/831,995, filed Jul. 19, 2006. The crude product after these treatments usually have low amount of metal content and other heteroatoms. This is beneficial to prevent fouling of downstream equipments or catalysts.

The product fractions can be separated from solvent and un-reacted starting olefins by distillation or other methods known in the art. The product fractions can be further fractionated into light fractions and residual fractions. These fractions typically have one unsaturated double bond per molecule. The double bonds are mostly vinylidene, with some the balance of the olefins being 1,2-disubstituted olefins or tri-substituted olefins. These olefins are suitable for further functionalization into other functional fluids or performance additives according to well-known olefin functionalization reaction, such as alkylation with aromatic containing compounds, with maleic anhydrides, with $CO/H_2$ via hydroformylation reactions, etc.

It is preferred to have more than 20 carbons, or 24 carbons or 30 carbons or 32 carbons or 36 carbons in the lube fraction molecules. The light fraction that contains C20, or C24, or C30, or C32, or C36 or less material is generally separated from the lube fraction by fractionation or by flash distillation at high temperatures in combination with vacuum. The light fraction often with high degrees of unsaturation can be used as a raw material for many chemical syntheses, such as additives, detergent alkylates, hydroformylation feeds, or can be used as drilling fluids, or metal working fluids after hydrofinishing if necessary. Typically the light fractions of C30 or less or of boiling points below 750° F. are separated by vacuum distillation at ~160° C. and <1 millitorr vacuum for at least two hours or by wipe film distillation or by other fractionation methods. The residual fraction typically has an initial boiling point of greater than 750° F., and is referred to as 750° F.+fraction in the lube industry. This residual fraction is then further hydrogenated or hydrofinished to give fully saturated paraffinic fluids.

The residual fractions, which usually have little or no light hydrocarbons with less than 18 carbons, or 20, or 24, or 30 or 32 carbons, can be used as lube base stock or high performance fluids if their bromine number is below 2. If the bromine number is above 2, it can be readily hydrogenated by conventional lube hydrofinishing processes and converted into fully saturated paraffin fluids with bromine number less than 2, usually significantly less than 2. Usually, a lower bromine number is more preferred, as it indicates better oxidative stability. These hydrogenated, saturated hydrocarbon paraffins are used as high performance lubricant base stocks or used as high performance functional fluids after formulation. Description of the typical lubricant or functional fluids formulation can be found in the book and the references in "Synthetic Lubricants and High-Performance Functional Fluids", 2$^{nd}$ edition, ed. by L. R. Rudnick and R. L. Shubkin, Marcel Dekker, Inc., N.Y. 1999.

In another embodiment, the process further comprises contacting PAO produced herein with hydrogen under typical hydrogenation conditions with hydrogenation catalyst to give a mostly saturated paraffinic PAO.

Meso-Metallocene Catalyst Compounds

For purposes of this invention and the claims thereto, the terms "hydrocarbyl radical," "hydrocarbyl," and hydrocarbyl group" are used interchangeably throughout this document. Likewise the terms "group," "radical," and "substituent" are also used interchangeably throughout this document. For purposes of this disclosure, "hydrocarbyl radical" is defined to be a $C_1$-$C_{100}$ radical and may be linear, branched, or cyclic. When cyclic, the hydrocarbon radical may be aromatic or non-aromatic. "Hydrocarbon radical" is defined to include substituted hydrocarbyl radicals, halocarbyl radicals, substituted halocarbyl radicals, silylcarbyl radicals, and germylcarbyl radicals as these terms are defined below. Substituted hydrocarbyl radicals are radicals in which at least one hydrogen atom has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. $CF_3$).

Substituted halocarbyl radicals are radicals in which at least one halocarbyl hydrogen or halogen atom has been substituted with at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also called silylcarbyls) are groups in which the silyl functionality is bonded directly to the indicated atom or atoms. Examples include $SiH_3$, $SiH_2R*$, $SiHR*_2$, $SiR*_3$, $SiH_2(OR*)$, $SiH(OR*)_2$, $Si(OR*)_3$, $SiH_2(NR*_2)$, $SiH(NR*_2)_2$, $Si(NR*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R*$, $GeHR*_2$, $GeR*_3$, $GeH_2(OR*)$, $GeH(OR*)_2$, $Ge(OR*)_3$, $GeH_2(NR*_2)$, $GeH(NR*_2)_2$, $Ge(NR*_2)_3$, and the like where R* is independently a hydrocarbyl or halocarbyl radical and two or more R* may join together to form a substituted or unsubstituted saturated, partially unsaturated or aromatic cyclic or polycyclic ring structure.

Polar radicals or polar groups are groups in which a heteroatom functionality is bonded directly to the indicated atom or atoms. They include heteroatoms of groups 1-17 of the periodic table (except carbon and hydrogen) either alone or connected to other elements by covalent bonds or other interactions such as ionic bonds, van der Waals forces, or hydrogen bonding. Examples of functional heteroatom containing groups include carboxylic acids, acid halides, carboxylic esters, carboxylic salts, carboxylic anhydrides, aldehydes and their chalcogen (Group 14) analogues, alcohols and phenols, ethers, peroxides and hydroperoxides, carboxylic amides, hydrazides and imides, amidines and other nitrogen analogues of amides, nitriles, amines and imines, azos, nitros, other nitrogen compounds, sulfur acids, selenium acids, thiols, sulfides, sulfoxides, sulfones, phosphines, phosphates, other phosphorus compounds, silanes, boranes, borates, alanes, aluminates. Functional groups may also be taken broadly to include organic polymer supports or inorganic support material such as alumina, and silica. Preferred examples of polar groups include $NR*_2$, $OR*$, $SeR*$, $TeR*$, $PR*_2$, $AsR*_2$, $SbR*_2$, $SR*$, $BR*_2$, $SnR*_3$, $PbR*_3$ and the like where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure.

In using the terms "substituted or unsubstituted cyclopentadienyl ligand", "substituted or unsubstituted indenyl ligand", "substituted or unsubstituted fluorenyl ligand" and "substituted or unsubstituted tetrahydroindenyl ligand", the substitution to the aforementioned ligand may be hydrocarbyl, substituted hydrocarbyl, halocarbyl, substituted halocarbyl, silylcarbyl, or germylcarbyl. The substitution may also be within the ring giving heterocyclopentadienyl ligands, heteroindenyl ligands, heterofluorenyl ligands, or heterotetrahydroindenyl ligands, each of which can additionally be substituted or unsubstituted.

In some embodiments, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, triacontynyl, butadienyl, pentadienyl, hexadienyl, heptadienyl, octadienyl, nonadienyl, and decadienyl. Also included are isomers of saturated, partially unsaturated and aromatic cyclic and polycyclic structures wherein the radical may additionally be subjected to the types of substitutions described above.

Examples include phenyl, methylphenyl, dimethylphenyl, ethylphenyl, diethylphenyl, propylphenyl, dipropylphenyl, benzyl, methylbenzyl, naphthyl, anthracenyl, cyclopentyl, cyclopentenyl, cyclohexyl, cyclohexenyl, methylcyclohexyl, cycloheptyl, cycloheptenyl, norbornyl, norbornenyl, adamantyl and the like. For this disclosure, when a radical is listed, it indicates that radical type and all other radicals formed when that radical type is subjected to the substitutions defined above. Alkyl, alkenyl and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Examples of cyclopentadienyl and indenyl ligands are illustrated below as part of the ligands.

A "ring carbon atom" is a carbon atom that is part of a cyclic ring structure. By this definition, an indenyl ligand has nine ring carbon atoms; a cyclopentadienyl ligand has five ring carbon atoms and a fluorenyl ligand has 13 carbon atoms. Thus an indene is equivalent to a Cp ring with two alkyl radical substituents and a fluorene is equivalent to a Cp ring with four alkyl radical substituents. In addition, the cyclic ring can also be hydrogenated, for example, di-hydro- or tetra-hydro-indenyl ligand, di-hydro, tetra-hydro or octa-hydro-fluorenyl ligands are suitable.

The metallocenes described herein are "meso" which means that the compounds represented by formula (1) [(Cp-A'-Cp*)MX$_1$X$_2$] have a plane of symmetry containing the metal center, M; and have a C$_{2v}$-axis of symmetry or pseudo C$_{2v}$-axis of symmetry through the metal center. Transition metal compounds have symmetry elements and belong to symmetry groups. These elements and groups are well established and can be referenced from Chemical Applications of Group Theory (2nd Edition) by F. Albert Cotton, Wiley-Interscience, 1971. Pseudo-symmetry, such as a pseudo C$_{2v}$-axis of symmetry refers to the same symmetry operation, however, the substituents on the ligand frame do not need to be identical, but of similar size and steric bulk. Substituents of similar size are typically within 4 atoms of each other, and of similar shape. For example, methyl, ethyl, n-propyl, n-butyl and iso-butyl substituents (e.g. C1-C4 primary bonded substituents) would be considered of similar size and steric bulk. Likewise, iso-propyl, sec-butyl, 1-methylbutyl, 1-ethylbutyl and 1-methylpentyl substituents (e.g. C3-C6 secondary bonded substituents) would be considered of similar size and steric bulk. Tert-butyl, 1,1-dimethylpropyl, 1,1-dimethylbutyl, 1,1-dimethylpentyl and 1-ethyl-1-methylpropyl (e.g. C4-C7 tertiary bonded substituents) would be considered of similar size and steric bulk. Phenyl, tolyl, xylyl, and mesityl substituents (C6-C9 aryl substituents) would be considered of similar size and steric bulk. Additionally, the bridging substituents of a compound with a pseudo C$_{2v}$-axis of symmetry do not have to be similar at all since they are far removed from the active site of the catalyst. Therefore, a compound with a pseudo C$_{2v}$-axis of symmetry could have for example, a Me$_2$Si, MeEtSi or MePhSi bridging ligand, and still be considered to have a pseudo C$_{2v}$-axis of symmetry given the appropriate remaining ligand structure. In other words, the meso-metallocenes containing a C$_{2v}$ symmetry are suitable for this application. In some embodiments, metallocenes with a C1-axis of symmetry may also be useful herein.

The meso-metallocene compounds (pre-catalysts), useful herein are preferably cyclopentadienyl, indenyl or fluorenyl derivatives of titanium, zirconium and hafnium. In general, useful titanocenes, zirconocenes and hafnocenes may be represented by the following formulae:

$$(Cp\text{-}A'\text{-}Cp^*)MX_1X_2 \qquad (I)$$

wherein:

M is the metal center, and is a Group 4 metal preferably titanium, zirconium or hafnium, preferably zirconium or hafnium;

Cp and Cp* are the same or different cyclopentadienyl rings that are each bonded to M, and substituted with from zero to four substituent groups S" being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent S" groups are optionally joined to form a substituted or unsubstituted, saturated, partially unsaturated, or aromatic cyclic or polycyclic substituent;

A' is a bridging group;

X$_1$ and X$_2$ are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or when Lewis-acid activators, such as methylalumoxane, which are capable of donating an X ligand as described above to the transition metal component are used, both X may, independently, be a halogen, alkoxide, aryloxide, amide, phosphide or other univalent anionic ligand or both X can also be joined to form a anionic chelating ligand.

Preferably in the meso-metallocenes represented by formula (I) A' is selected from R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'N, R'P, O, S, Se, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ and when Cp is different than Cp*, R' is a C1-C5 containing hydrocarbyl, substituted hydrocarbyl, halocarbyl, substituted halocarbyl, silylcarbyl or germylcarbyl substituent, and when Cp is the same as Cp*, R' is a C$_1$-C$_{20}$-containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated, cyclic or polycyclic substituent.

The following are representative constituent moieties for the meso-metallocene components of formula (I). The list is for illustrative purposes only and should not be construed to be limiting in any way. A number of final components may be formed by permuting all possible combinations of the constituent moieties with each other. When hydrocarbyl radicals including alkyl, alkenyl, alkynyl, cycloalkyl, cycloalkenyl, cycloalkynyl and aromatic radicals are disclosed in this application the term includes all isomers. For example, butyl includes n-butyl, 2-methylpropyl, tert-butyl, and cyclobutyl; pentyl includes n-pentyl, 1-methylbutyl, 2-methylbutyl, 3-methylbutyl, 1-ethylpropyl, neopentyl, cyclopentyl and methylcyclobutyl; butenyl includes E and Z forms of 1-butenyl, 2-butenyl, 3-butenyl, 1-methyl-1-propenyl, 1-methyl-2-propenyl, 2-methyl-1-propenyl and 2-methyl-2-propenyl. This includes when a radical is bonded to another group, for example, propylcyclopentadienyl include n-propylcyclopentadienyl, isopropylcyclopentadienyl and cyclopropylcyclopentadienyl.

In general, the ligands or groups noted in the following section include all isomeric forms. For example, dimethylcyclopentadienyl includes 1,2-dimethylcyclopentadienyl and 1,3-dimethylcyclopentadienyl; methylindenyl includes 1-methylindenyl, 2-methylindenyl, 3-methylindenyl, 4-methylindenyl, 5-methylindenyl, 6-methylindenyl and 7-methylindenyl; methylethylphenyl includes ortho-methylethylphenyl, meta-methylethylphenyl and para-methylethylphenyl. To illustrate members of the transition metal component, select any combination of the species listed as follows. These include one of titanium, zirconium and hafnium as the metal component and two of the ligands (Cp and Cp*) that follow: methylcyclopentadienyl, dimethylcyclopentadienyl, trimethylcyclopentadienyl, tetramethylcyclopentadienyl, ethylcyclopentadienyl, diethylcyclopentadienyl, propylcyclopentadienyl, dipropylcyclopentadienyl, butylcyclopentadienyl, dibutylcyclopentadienyl, pentylcyclopentadienyl, dipentylcyclopentadienyl, hexylcyclopentadienyl, dihexylcyclopentadienyl, heptylcyclopentadienyl, diheptylcyclopentadienyl, octylcyclopentadienyl, dioctylcyclopentadienyl, nonylcyclopentadienyl, dinonylcyclopentadienyl, decylcyclopentadienyl, didecylcyclopentadienyl, undecylcyclopentadienyl, dodecylcyclopentadienyl, tridecylcyclopentadienyl, tetradecylcyclopentadienyl, pentadecylcyclopentadienyl, hexadecylcyclopentadienyl, heptadecylcyclopentadienyl, octadecylcyclopentadienyl, nonadecylcyclopentadienyl, eicosylcyclopentadienyl, heneicosylcyclopentadienyl, docosylcyclopentadienyl, tricosylcyclopentadienyl, tetracosylcyclopentadienyl, pentacosylcyclopentadienyl, hexacosylcyclopentadienyl, heptacosylcyclopentadienyl, octacosylcyclopentadienyl, nonacosylcyclopentadienyl, triacontylcyclopentadienyl, cyclohexylcyclopentadienyl, phenylcyclopentadienyl, diphenylcyclopentadienyl, triphenylcyclopentadienyl, tetraphenylcyclopentadienyl, tolylcyclopentadienyl, benzylcyclopentadienyl, phenethylcyclopentadienyl, cyclohexylmethylcyclopentadienyl, naphthylcyclopentadienyl, methylphenylcyclopentadienyl, methyltolylcyclopentadienyl, methylethylcyclopentadienyl, methylpropylcyclopentadienyl, methylbutylcyclopentadienyl, methylpentylcyclopentadienyl, methylhexylcyclopentadienyl, methylheptylcyclpentadienyl, methyloctylcyclopentadienyl, methylnonylcyclopentadienyl, methyldecylcyclopentadienyl, vinylcyclopentadienyl, propenylcyclopentadienyl, butenylcyclopentadienyl, indenyl, methylindenyl, dimethylindenyl, trimethylindenyl, tetramethylindenyl, pentamethylindenyl, methylpropylindenyl, dimethylpropylindenyl, methyldipropylindenyl, methylethylindenyl, methylbutylindenyl, ethylindenyl, propylindenyl, butylindenyl, pentylindenyl, hexylindenyl, heptylindenyl, octylindenyl, nonylindenyl, decylindenyl, phenylindenyl, (fluorophenyl)indenyl, (methylphenyl)indenyl, biphenylindenyl, (bis(trifluoromethyl)phenyl)indenyl, napthylindenyl, phenanthrylindenyl, benzylindenyl, benzindenyl, cyclohexylindenyl, methylphenylindenyl, ethylphenylindenyl, propylphenylindenyl, methylnapthylindenyl, ethylnapthylindenyl, propylnapthylindenyl, (methylphenyl)indenyl, (dimethylphenyl)indenyl, (ethylphenyl)indenyl, (diethylphenyl)indenyl, (propylphenyl)indenyl, (dipropylphenyl)indenyl, tetrahydroindenyl, methyltetrahydroindenyl, ethyltetrahydroindenyl, propyltetrahydroindenyl, butyltetrahydroindenyl, phenyltetrahydroindenyl, fluorenyl, tetrahydrofluorenyl, octahydrofluorenyl, alkyl or silyl substituted fluorenyl or hydrofluorenyl, (diphenylmethyl)cyclopentadienyl, trimethylsilylcyclopentadienyl, triethylsilylcyclopentadienyl, trimethylgermylcyclopentadienyl, trifluoromethylcyclopentadienyl, cyclopenta[b]thienyl, cyclopenta[b]furanyl, cyclopenta[b]selenophenyl, cyclopenta[b]tellurophenyl, cyclopenta[b]pyrrolyl, cyclopenta[b]phospholyl, cyclopenta[b]arsolyl, cyclopenta[b]stibolyl, methylcyclopenta[b]thienyl, methylcyclopenta[b]furanyl, methylcyclopenta[b]selenophenyl, methylcyclopenta[b]tellurophenyl, methylcyclopenta[b]pyrrolyl, methylcyclopenta[b]phospholyl, methylcyclopenta[b]arsolyl, methylcyclopenta[b]stibolyl, dimethylcyclopenta[b]thienyl, dimethylcyclopenta[b]furanyl, dimethylcyclopenta[b]pyrrolyl, dimethylcyclopenta[b]phospholyl, trimethylcyclopenta[b]thienyl, trimethylcyclopenta[b]furanyl, trimethylcyclopenta[b]pyrrolyl, trimethylcyclopenta[b]phospholyl, ethylcyclopenta[b]thienyl, ethylcyclopenta[b]furanyl, ethylcyclopenta[b]pyrrolyl, ethylcyclopenta[b]phospholyl, diethylcyclopenta[b]thienyl, diethylcyclopenta[b]furanyl, diethylcyclopenta[b]pyrrolyl, diethylcyclopenta[b]phospholyl, triethylcyclopenta[b]thienyl, triethylcyclopenta[b]furanyl, triethylcyclopenta[b]pyrrolyl, triethylcyclopenta[b]phospholyl, propylcyclopenta[b]thienyl, propylcyclopenta[b]furanyl, propylcyclopenta[b]pyrrolyl, propylcyclopenta[b]phospholyl, dipropylcyclopenta[b]thienyl, dipropylcyclopenta[b]furanyl, dipropylcyclopenta[b]pyrrolyl, dipropylcyclopenta[b]phospholyl, tripropylcyclopenta[b]thienyl, tripropylcyclopenta[b]furanyl, tripropylcyclopenta[b]pyrrolyl, tripropylcyclopenta[b]phospholyl, butylcyclopenta[b]thienyl, butylcyclopenta[b]furanyl, butylcyclopenta[b]pyrrolyl, butylcyclopenta[b]phospholyl, dibutylcyclopenta[b]thienyl, dibutylcyclopenta[b]furanyl, dibutylcyclopenta[b]pyrrolyl, dibutylcyclopenta[b]phospholyl, tributylcyclopenta[b]thienyl, tributylcyclopenta[b]furanyl, tributylcyclopenta[b]pyrrolyl, tributylcyclopenta[b]phospholyl, ethylmethylcyclopenta[b]thienyl, ethylmethylcyclopenta[b]furanyl, ethylmethylcyclopenta[b]pyrrolyl, ethylmethylcyclopenta[b]phospholyl, methylpropylcyclopenta[b]thienyl, methylpropylcyclopenta[b]furanyl, methylpropylcyclopenta[b]pyrrolyl, methylpropylcyclopenta[b]phospholyl, butylmethylcyclopenta[b]thienyl, butylmethylcyclopenta[b]furanyl, butylmethylcyclopenta[b]pyrrolyl, butylmethylcyclopenta[b]phospholyl, cyclopenta[c]thienyl, cyclopenta[c]furanyl, cyclopenta[c]selenophenyl, cyclopenta[c]tellurophenyl, cyclopenta[c]pyrrolyl, cyclopenta[c]phospholyl, cyclopenta[c]arsolyl, cyclopenta[c]stibolyl, methylcyclopenta[c]thienyl, methylcyclopenta[c]furanyl, methylcyclopenta[c]selenophenyl, methylcyclopenta[c]tellurophenyl, methylcyclopenta[c]pyrrolyl, methylcyclopenta[c]phospholyl, methylcyclopenta[c]arsolyl, methylcyclopenta[c]stibolyl, dimethylcyclopenta[c]thienyl, dimethylcyclopenta[c]furanyl, dimethylcyclopenta[c]pyrrolyl, dimethylcyclopenta

[c]phospholyl, trimethylcyclopenta[c]thienyl, trimethylcyclopenta[c]furanyl, trimethylcyclopenta[c]pyrrolyl, trimethylcyclopenta[c]phospholyl, ethylcyclopenta[c]thienyl, ethylcyclopenta[c]furanyl, ethylcyclopenta[c]pyrrolyl, ethylcyclopenta[c]phospholyl, diethylcyclopenta[c]thienyl, diethylcyclopenta[c]furanyl, diethylcyclopenta[c]pyrrolyl, diethylcyclopenta[c]phospholyl, triethylcyclopenta[c]thienyl, triethylcyclopenta[c]furanyl, triethylcyclopenta[c]pyrrolyl, triethylcyclopenta[c]phospholyl, propylcyclopenta[c]thienyl, propylcyclopenta[c]furanyl, propylcyclopenta[c]pyrrolyl, propylcyclopenta[c]phospholyl, dipropylcyclopenta[c]thienyl, dipropylcyclopenta[c]furanyl, dipropylcyclopenta[c]pyrrolyl, dipropylcyclopenta[c]phospholyl, tripropylcyclopenta[c]thienyl, tripropylcyclopenta[c]furanyl, tripropylcyclopenta[c]pyrrolyl, tripropylcyclopenta[c]phospholyl, butylcyclopenta[c]thienyl, butylcyclopenta[c]furanyl, butylcyclopenta[c]pyrrolyl, butylcyclopenta[c]phospholyl, dibutylcyclopenta[c]thienyl, dibutylcyclopenta[c]furanyl, dibutylcyclopenta[c]pyrrolyl, dibutylcyclopenta[c]phospholyl, tributylcyclopenta[c]thienyl, tributylcyclopenta[c]furanyl, tributylcyclopenta[c]pyrrolyl, tributylcyclopenta[c]phospholyl, ethylmethylcyclopenta[c]thienyl, ethylmethylcyclopenta[c]furanyl, ethylmethylcyclopenta[c]pyrrolyl, ethylmethylcyclopenta[c]phospholyl, methylpropylcyclopenta[c]thienyl, methylpropylcyclopenta[c]furanyl, methylpropylcyclopenta[c]pyrrolyl, methylpropylcyclopenta[c]phospholyl, butylmethylcyclopenta[c]thienyl, butylmethylcyclopenta[c]furanyl, butylmethylcyclopenta[c]pyrrolyl, butylmethylcyclopenta[c]phospholyl, pentamethylcyclopentadienyl, tetrahydroindenyl, methyltetrahydroindenyl and dimethyltetrahydroindenyl. The above unbridged ligands can be bridged by an A group as defined herein.

In a preferred embodiment of the invention, when used with an NCA, Cp is the same as Cp* and is a substituted cyclopentadienyl, indenyl, tetrahydroindenyl, or fluorenyl ligand.

Preferred meso-metallocene compounds (pre-catalysts) which, according to the present invention, provide catalyst systems which are specific to the production of PAO of 2 cSt or greater include: dimethylsilylbis(indenyl)zirconium dichloride, dimethylsilylbis(indenyl) zirconium dimethyl, diphenylsilylbis(indenyl)zirconium dichloride, diphenylsilylbis(indenyl) zirconium dimethyl, methylphenylsilylbis(indenyl)zirconium dichloride, methylphenylsilylbis(indenyl) zirconium dimethyl, ethylenebis(indenyl)zirconium dichloride, ethylenebis(indenyl)zirconium dimethyl, methylenebis(indenyl)zirconium dichloride, methylenebis(indenyl) zirconium dimethyl, dimethylsilylbis(indenyl) hafnium dichloride, dimethylsilylbis(indenyl) hafnium dimethyl, diphenylsilylbis(indenyl) hafnium dichloride, diphenylsilylbis(indenyl) hafnium dimethyl, methylphenylsilylbis(indenyl) hafnium dichloride, methylphenylsilylbis(indenyl) hafnium dimethyl, ethylenebis(indenyl) hafnium dichloride, ethylenebis(indenyl) hafnium dimethyl, methylenebis(indenyl) hafnium dichloride, methylenebis(indenyl) hafnium dimethyl, dimethylsilylbis(tetrahydroindenyl)zirconium dichloride, dimethylsilylbis(tetrahydroindenyl)zirconium dimethyl, diphenylsilylbis(tetrahydroindenyl) zirconium dimethyl, methylphenylsilylbis(tetrahydroindenyl)zirconium dichloride, methylphenylsilylbis(tetrahydroindenyl) zirconium dimethyl, ethylenebis(tetrahydroindenyl) zirconium dichloride, ethylenebis(tetrahydroindenyl)zirconium dimethyl, methylenebis(tetrahydroindenyl)zirconium dichloride, dimethylmethylenebis(indenyl)zirconium dichloride, diphenylmethylenebis(indenyl)zirconium dichloride, diethylmethylenebis(indenyl)zirconium dichloride, methylenebis(tetrahydroindenyl)zirconium dimethyl, dimethylsilylbis(tetrahydroindenyl) hafnium dichloride, dimethylsilylbis(tetrahydroindenyl) hafnium dimethyl, diphenylsilylbis(tetrahydroindenyl) hafnium dichloride, diphenylsilylbis(tetrahydroindenyl) hafnium dimethyl, methylphenylsilylbis(tetrahydroindenyl) hafnium dichloride, methylphenylsilylbis(tetrahydroindenyl) hafnium dimethyl, ethylenebis(tetrahydroindenyl) hafnium dichloride, ethylenebis(tetrahydroindenyl) hafnium dimethyl, methylenebis(tetrahydroindenyl) hafnium dichloride, methylenebis(tetrahydroindenyl) hafnium dimethyl, dimethylsilylbis(4,7-dimethylindenyl)zirconium dichloride, dimethylsilylbis(4,7-dimethylindenyl)zirconium dimethyl, diphenylsilylbis(4,7-dimethylindenyl)zirconium dichloride, diphenylsilylbis(4,7-dimethylindenyl)zirconium dimethyl, methylphenylsilylbis(4,7-dimethylindenyl)zirconium dichloride, methylphenylsilylbis(4,7-dimethylindenyl)zirconium dimethyl, ethylenebis(4,7-dimethylindenyl)zirconium dichloride, ethylenebis(4,7-dimethylindenyl)zirconium dimethyl, methylenebis(4,7-dimethylindenyl)zirconium dichloride, methylenebis(4,7-dimethylindenyl)zirconium dimethyl, dimethylsilylbis(4,7-dimethylindenyl) hafnium dichloride, dimethylsilylbis(4,7-dimethylindenyl) hafnium dimethyl, diphenylsilylbis(4,7-dimethylindenyl) hafnium dichloride, diphenylsilylbis(4,7-dimethylindenyl) hafnium dimethyl, methylphenylsilylbis(4,7-dimethylindenyl) hafnium dichloride, methylphenylsilylbis(4,7-dimethylindenyl) hafnium dimethyl, ethylenebis(4,7-dimethylindenyl) hafnium dichloride, ethylenebis(4,7-dimethylindenyl) hafnium dimethyl, methylenebis(4,7-dimethylindenyl) hafnium dichloride, methylenebis(4,7-dimethylindenyl) hafnium dimethyl, dimethylsilylbis(2-methyl-4-napthylindenyl)zirconium dichloride, dimethylsilylbis(2-methyl-4-napthylindenyl)zirconium dimethyl, diphenylsilylbis(2-methyl-4-napthylindenyl)zirconium dichloride, dimethylsilylbis(2,3-dimethylcyclopentadienyl)zirconium dichloride, dimethylsilylbis(2,3-dimethylcyclopentadienyl)zirconium dimethyl, diphenylsilylbis(2,3-dimethylcyclopentadienyl)zirconium dichloride, diphenylsilylbis(2,3-dimethylcyclopentadienyl) zirconium dimethyl, methylphenylsilylbis(2,3-dimethylcyclopentadienyl)zirconium dichloride, methylphenylsilylbis(2,3-dimethylcyclopentadienyl)zirconium dimethyl, ethylenebis(2,3-dimethylcyclopentadienyl)zirconium dichloride, ethylenebis(2,3-dimethylcyclopentadienyl) zirconium dimethyl, methylenebis(2,3-dimethylcyclopentadienyl)zirconium dichloride, methylenebis(2,3-dimethylcyclopentadienyl)zirconium dimethyl, dimethylsilylbis(2,3-dimethylcyclopentadienyl) hafnium dichloride, dimethylsilylbis(2,3 dimethylcyclopentadienyl) hafnium dimethyl, diphenylsilylbis(2,3-dimethylcyclopentadienyl) hafnium dichloride, diphenylsilylbis(2,3-dimethylcyclopentadienyl) hafnium dimethyl, methylphenylsilylbis(2,3-dimethylcyclopentadienyl) hafnium dichloride, methylphenylsilylbis(2,3-dimethylcyclopentadienyl) hafnium dimethyl, ethylenebis(2,3-dimethylcyclopentadienyl) hafnium dichloride, ethylenebis(2,3-dimethylcyclopentadienyl) hafnium dimethyl, methylenebis(2,3-dimethylcyclopentadienyl) hafnium dichloride, methylenebis(2,3-dimethylcyclopentadienyl) hafnium dimethyl, dimethylsilylbis(3-trimethylsilylcyclopentadienyl) zirconium dichloride, dimethylsilylbis(3-trimethylsilylcyclopentadienyl)zirconium dimethyl, diphenylsilylbis(3-trimethylsilylcyclopentadienyl)zirconium dichloride, diphenylsilylbis(3-trimethylsilylcyclopentadienyl)zirconium dimethyl, methylphenylsilylbis(3-trimethylsilylcyclopentadienyl)zirconium dichloride, methylphenylsilylbis(3-trimethylsilylcyclopentadienyl)zirconium dimethyl, ethylenebis(3-trimethylsilylcyclopentadienyl)zirconium dichloride, ethylenebis(3-trimethylsilylcyclopentadienyl)zirconium dimethyl, methylenebis(3-trimethylsilylcyclopentadienyl)zirconium dichloride, methylenebis(3-trimethylsilylcyclopentadienyl) zirconium dimethyl, dimethylsilylbis(3-trimethylsilylcyclopentadienyl) hafnium dichloride, dimethylsilylbis(3-trimethylsilylcyclopentadienyl) hafnium dimethyl, diphenylsilylbis(3-trimethylsilylcyclopentadienyl) hafnium dichloride, diphenylsilylbis(3-trimethylsilylcyclopentadienyl) hafnium dimethyl, methylphenylsilylbis(3-trimethylsilylcyclopentadienyl) hafnium dichloride, methylphenylsilylbis(3-trimethylsilylcyclopentadienyl) hafnium dimethyl, ethylenebis(3-trimethylsilylcyclopentadienyl) hafnium dichloride, ethylenebis(3-trimethylsilylcyclopentadienyl) hafnium dimethyl, methylenebis(3-trimethylsilylcyclopentadienyl) hafnium dichloride, and methylenebis(3-trimethylsilylcyclopentadienyl) hafnium dimethyl.

Particularly preferred species are the meso versions of: dimethylsilylbis(indenyl) zirconium dichloride, dimethylsilylbis(indenyl)zirconium dimethyl, ethylenebis(indenyl) zirconium dichloride, ethylenebis(indenyl)zirconium dimethyl, dimethylsilylbis(tetrahydroindenyl)zirconium dichloride, dimethylsilylbis(tetrahydroindenyl) zirconium dimethyl, ethylenebis(tetrahydroindenyl)zirconium dichloride, ethylenebis(tetrahydroindenyl)zirconium dimethyl, dimethylsilylbis(4,7-dimethylindenyl) zirconium dichloride, dimethylsilylbis(4,7-dimethylindenyl)zirconium dimethyl, ethylenebis(4,7-dimethylindenyl)zirconium dichloride, ethylenebis(4,7-dimethylindenyl) zirconium dimethyl, dimethylsilylbis(indenyl) hafnium dichloride, dimethylsilylbis(indenyl) hafnium dimethyl, ethylenebis(indenyl) hafnium dichloride, ethylenebis(indenyl) hafnium dimethyl, dimethylsilylbis(tetrahydroindenyl) hafnium dichloride, dimethylsilylbis(tetrahydroindenyl) hafnium dimethyl, ethylenebis(tetrahydroindenyl) hafnium dichloride, ethylenebis(tetrahydroindenyl) hafnium dimethyl, dimethylsilylbis(4,7-dimethylindenyl) hafnium dichloride, dimethylsilylbis(4,7-dimethylindenyl) hafnium dimethyl, ethylenebis(4,7-dimethylindenyl) hafnium dichloride, and ethylenebis(4,7-dimethylindenyl) hafnium dimethyl. Other preferred catalysts include diphenylmethylidene(cyclopentadienyl)(9-fluorenyl)zirconium dichloride, iso-propylidene(cyclopentadienyl)(9-fluorenyl)zirconium dichloride, iso-propylidene(3-methylcyclopentadienyl)(9-fluorenyl)zirconium dichloride, ethylenebis(9-fluorenyl)zirconium dichloride, dimethylsilylbis(9-fluorenyl)zirconium dichloride, dimethylsilyl(cyclopentadienyl)(9-fluorenyl)zirconium dichloride, diphenylsilyl(cyclopentadienyl)(9-fluorenyl)zirconium dichloride, their analogs of dimethyls or the analogs of hafnium meso-metallocenes.

The amount of meso-metallocene used in the present invention have less than about 35 wt % racemic isomer, preferably 30 wt % or less, preferably 25 wt % or less, more preferably 20 wt % or less, preferably 15 wt % or less, more preferably 10 wt % or less and even more preferably 5 wt % or less.

Activators and Catalyst Activation

The catalyst precursors, when activated by an activator such as non-coordinating anion activator, form active catalysts for the polymerization or oligomerization of olefins. Activators that may be used include Lewis acid activators such as triphenylboron, tris-perfluorophenylboron, tris-perfluorophenylaluminum and the like and or ionic activators such as dimethylanilinium tetrakisperfluorophenylborate, triphenylcarboniumtetrakis perfluorophenylborate, dimethylaniliniumtetrakisperfluorophenylaluminate, and the like.

A co-activator is a compound capable of alkylating the transition metal complex, such that when used in combination with an activator, an active catalyst is formed. Co-activators include alumoxanes such as methylalumoxane, modified alumoxanes such as modified methylalumoxane, and aluminum alkyls such trimethylaluminum, tri-isobutylaluminum, triethylaluminum, and tri-isopropylaluminum, tri-n-hexylaluminum, tri-n-octylaluminum, tri-n-decylaluminum or tri-n-dodecylaluminum. Co-activators are typically used in combination with Lewis acid activators and ionic activators when the pre-catalyst is not a dihydrocarbyl or dihydride complex. Sometimes co-activators are also used and added to the feed streams or to the catalyst stream or to the reactor in single or multiple streams as scavengers to deactivate impurities in feed or reactors. In many cases, even when the dialkyl form of the meso-metallocene component is used, small amounts of co-activator is also added to the catalyst system or to the reactor system for a further promoting effect or to scavenge an impurity of the reactor system.

Particularly preferred co-activators include alkylaluminum compounds represented by the formula: $R_3Al$, where each R is, independently, a C1 to C18 alkyl group, preferably each R is, independently, selected from the group consisting of methyl, ethyl, n-propyl, iso-propyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecyl, n-hexadecyl, n-heptadecyl, n-octadecyl, and their iso-analogs.

Ionic activators (sometimes used in combination with a co-activator) may be used in the practice of this invention. Preferably, discrete ionic activators such as $[Me_2PhNH][B(C_6F_5)_4]$, $[Ph_3C][B(C_6F_5)_4]$, $[Me_2PhNH][B((C_6H_3\text{-}3,5\text{-}(CF_3)_2))_4]$, $[Ph_3C][B((C_6H_3\text{-}3,5\text{-}(CF_3)_2))_4]$, $[NH_4][B(C_6H_5)_4]$, as $[R_2PhNH][B(C_6F_5)_4]$, $[R_2PhNH][B((C_6H_3\text{-}3,5\text{-}(CF_3)_2))_4]$, $[R_3PhN][B(C_6F_5)_4]$, $[R_3PhN][B((C_6H_3\text{-}3,5\text{-}(CF_3)_2))_4]$ where R=C1 to C20 radicals, or Lewis acidic activators such as $B(C_6F_5)_3$ or $B(C_6H_5)_3$ can be used, where Ph is phenyl and Me is methyl. Other preferred co-activators, when used, are alumoxanes such as methylalumoxane, modified alumoxanes such as modified methylalumoxane, and aluminum alkyls such as tri-isobutylaluminum, and trimethylaluminum, triethylaluminum, and tri-isopropylaluminum, tri-n-hexylaluminum, tri-n-octylaluminum, tri-n-decylaluminum or tri-n-dodecylaluminum.

It is within the scope of this invention to use an ionizing or stoichiometric activator, neutral or ionic, such as tri(n-butyl) ammoniumtetrakis(pentafluorophenyl) borate, a trisperfluorophenyl boron metalloid precursor or a trisperfluoronaphthyl boron metalloid precursor, polyhalogenated heteroborane anions (WO 98/43983), boric acid (U.S. Pat. No. 5,942,459) or combination thereof.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl or mixtures thereof. Even more preferably, the three groups are halogenated, preferably fluorinated, aryl groups.

Most preferably, the neutral stoichiometric activator is trisperfluorophenyl boron or trisperfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be prepared by reacting a transition metal compound with an activator, such as $B(C_6F_6)_3$, which upon reaction with the hydrolyzable ligand (X') of the transition metal compound forms an anion, such as $([B(C_6F_5)_3(X')]^-)$, which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Brønsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic, diolefinic, and acetylenically unsaturated substrates or other neutral Lewis bases such as ethers, nitriles, and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes. In a preferred embodiment, the stoichiometric activators include a cation and an anion component, and may be represented by the following formula: $(L^{}-H)^{d+}(A^{d-})$ wherein $L^{}$ is a neutral Lewis base; H is hydrogen; $(L^{**}-H)^{d+}$ is a Brønsted acid, $A^{d-}$ is a non-coordinating anion having the charge d−, d is an integer from 1 to 3.

The cation component, $(L^{**}-H)^{d+}$ may include Brønsted acids such as protons or protonated Lewis bases or reducible Lewis acids capable of protonating or abstracting a moiety, such as an alkyl or aryl, from the precatalyst after alkylation.

The activating cation $(L^{}-H)^{d+}$ may be a Brønsted acid, capable of donating a proton to the alkylated transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo—N,N-dimethylaniline, p-nitro-N,N-dimethylaniline, phosphoniums from triethylphosphine, triphenylphosphine, and diphenylphosphine, oxoniums from ethers such as dimethyl ether, diethyl ether, tetrahydro furan and dioxane, sulfoniums from thioethers, such as diethyl thioethers and tetrahydrothiophene, and mixtures thereof. The activating cation $(L^{}-H)^{d+}$ may also be a moiety such as silver, tropylium, carbeniums, ferroceniums and mixtures, preferably carboniums and ferroceniums; most preferably triphenyl carbonium.

The anion component $A^{d-}$ include those having the formula $[M^{k+}Q_n]^{d-}$ wherein k is an integer from 1 to 3; n is an integer from 2-6; n-k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst in combination with a co-activator in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri (n-butyl)ammonium tetrakis(3,5-bis(trifluoromethyl)phenyl)borate, tri(tert-butyl)ammonium tetrakis(3,5-bis (trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, and dialkyl ammonium salts such as: di-(iso-propyl)ammonium tetrakis(pentafluorophenyl)borate, and dicyclohexylammonium tetrakis(pentafluorophenyl)borate; and other salts such as tri(o-tolyl)phosphonium tetrakis(pentafluorophenyl)borate, tri(2,6-dimethylphenyl)phosphonium tetrakis(pentafluorophenyl) borate, tropylium tetraphenylborate, triphenylcarbenium tetraphenylborate, triphenylphosphonium tetraphenylborate, triethylsilylium tetraphenylborate, benzene(diazonium)tetraphenylborate, tropylium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene (diazonium)tetrakis(pentafluorophenyl)borate, tropylium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, tropylium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, tropylium tetrakis(perfluorobiphenyl)borate, triphenylcarbenium tetrakis(perfluorobiphenyl)borate, triphenylphosphonium tetrakis (perfluorobiphenyl)borate, triethylsilylium tetrakis (perfluorobiphenyl)borate, benzene(diazonium)tetrakis (perfluorobiphenyl)borate, tropylium tetrakis(3,5-bis (trifluoromethyl)phenyl)borate, triphenylcarbenium tetrakis (3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl) phenyl)borate, and benzene(diazonium)tetrakis(3,5-bis(trifluoromethyl)phenyl)borate.

Most preferably, the ionic stoichiometric activator (L**-H)$_d^+$ (A$^{d-}$) is N,N-dimethylanilinium tetrakis(perfluorophenyl)borate, N,N-dimethylanilinium tetrakis(perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis (3,5-bis(trifluoromethyl)phenyl)borate, or triphenylcarbenium tetra(perfluorophenyl)borate.

The catalyst precursors can also be activated with cocatalysts or activators that comprise non-coordinating anions containing metalloid-free cyclopentadienide ions. These are described in U.S. Patent Publication 2002/0058765 A1, published on 16 May 2002, and for the instant invention, require the addition of a co-activator to the catalyst pre-cursor. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Preferred non-coordinating anions useful in accordance with this invention are those that are compatible, stabilize the transition metal complex cation in the sense of balancing its ionic charge at +1, yet retain sufficient lability to permit displacement by an ethylenically or acetylenically unsaturated monomer during polymerization. These types of cocatalysts are sometimes used with scavengers such as but not limited to tri-iso-butylaluminum, tri-n-octylaluminum, tri-n-hexylaluminum, triethylaluminum or trimethylaluminum.

Invention processes also can employ cocatalyst compounds or activator compounds that are initially neutral Lewis acids but form a cationic metal complex and a noncoordinating anion, or a zwitterionic complex upon reaction with the alkylated transition metal compounds. The alkylated meso-metallocene compound is formed from the reaction of the catalyst pre-cursor and the co-activator. For example, tris(pentafluorophenyl) boron or aluminum act to abstract a hydrocarbyl ligand to yield an invention cationic transition metal complex and stabilizing noncoordinating anion, see EP-A-0 427 697 and EP-A-0 520 732 for illustrations of analogous Group-4 meso-metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", *Chem. Rev.*, 100, 1391-1434 (2000).

When the cations of noncoordinating anion precursors are Brønsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation.

When an ionic or neutral stoichiometric activator (such as an NCA) is used, the catalyst-precursor-to-activator molar ratio is from 1:10 to 1:1; 1:1 to 10:1; 1:1 to 2:1; 1:1 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The catalyst-precursor-to-co-activator molar ratio is from 1:500 to 1:1, 1:250 to 1:1, 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include trialkylaluminum including trimethyl, triethyl, tri-n-propyl, tri-n-hexyl, tri-n-butyl, tri-n-octyl, tri-n-dodecyl, tri-isopropyl, tri-isobutyl, or tri-isopentyl, etc. with dimethylanilinium tetrakis(pentafluorophenyl)borate or tris(pentafluorophenyl)boron, and mixtures of trimethyl aluminum with dimethylanilinium tetrakis(pentafluorophenyl)borate or tris(pentafluorophenyl)boron.

In some embodiments, methylalumoxane, modified methylalumoxane, or mixtures of alkylalumoxanes are also used by themselves or as one of the many co-activator components. However, it is often not necessary and less desirable to use alumoxanes because alumoxane compounds are generally more expensive than trialkylaluminum or trialkylboron compounds.

In some embodiments, scavenging compounds are used. Typical aluminum or boron alkyl components useful as scavengers are represented by the general formula $R^xJZ_2$ where J is aluminum or boron, $R^x$ selected from C1 to C20 alkyl radicals and can be the same or different; and each Z is independently $R^x$ or a different univalent anionic ligand such as halogen (Cl, Br, I), alkoxide (OR$^x$) and the like. Most preferred aluminum alkyls include triethylaluminum, diethylaluminum chloride, tri-iso-butylaluminum, tri-n-octylaluminum. tri-n-hexylaluminum, trimethylaluminum and the like. Preferred boron alkyls include triethylboron. Scavenging compounds may also be alumoxanes and modified alumoxanes including methylalumoxane and modified methylalumoxane.

In an alternate embodiment, alkylalumoxane compounds (such as methyl alumoxane, and modified methylalumoxane) are present in the reaction zone at less than 3 milligrams (mg) of alumoxane/gram of olefin feed, preferably less than 1 mg of alumoxane/gram of olefin feed, preferably less than 0.5 mg of alumoxane/g of olefin feed.

The active species of the catalyst maybe in homogenous or in colloidal form in the reaction mixture or, when supported on solid, in solid form.

Supported Catalysts

Supported catalysts and or supported catalyst systems may be used to prepare PAO's. To prepare uniform supported catalysts, the catalyst precursor preferably dissolves in the chosen solvent. The term "uniform supported catalyst" means that the catalyst precursor, the activator, and or the activated catalyst approach uniform distribution upon the support's accessible surface area, including the interior pore surfaces of porous supports. Some embodiments of supported catalysts prefer uniform supported catalysts; other embodiments show no such preference.

Useful supported catalyst systems may be prepared by any method effective to support other coordination catalyst systems, effective meaning that the catalyst so prepared can be used for oligomerizing or polymerizing olefins in a heterogeneous process. The catalyst precursor, activator, co-activator (if present), suitable solvent, and support may be added in any order or simultaneously.

By one method, the activator, dissolved in an appropriate solvent such as toluene, may be stirred with the support material for 1 minute to 10 hours to prepare the supported catalyst. The total solution volume (of the catalyst solution, the activator solution or both) may be greater than the pore volume of the support, but some embodiments limit the total solution volume below that needed to form a gel or slurry (about 90% to 400%, preferably about 100-200%, of the pore volume). The mixture is optionally heated from 30-200° C. during this time. The catalyst precursor may be added to this mixture as a solid, if a suitable solvent is employed in the previous step, or as a solution. Alternatively, the mixture can be filtered, and the resulting solid mixed with a catalyst precursor solution. Similarly, the mixture may be vacuum dried and mixed with a catalyst precursor solution. The resulting catalyst mixture is then stirred for 1 minute to 10 hours, and the supported catalyst is either filtered from the solution and vacuum dried or subjected to evaporation to remove the solvent.

Alternatively, the catalyst precursor and activator may be combined in solvent to form a solution. The support is then added to the solution, and the resulting mixture is stirred, typically for 1 minute to 10 hours. The total activator/catalyst-precursor solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and typically over 10-16 hours; however, greater or lesser times and temperatures may be used.

The catalyst precursor may also be supported absent the activator; in this case, the activator (and optionally co-activator) is added to the liquid phase of a slurry process. For example, a solution of catalyst precursor may be mixed with a support material for a period of about 1 minute to 10 hours. The resulting precatalyst mixture may be filtered from the solution and dried under vacuum or treated with evaporation to remove the solvent. The total catalyst-precursor-solution volume may be greater than the support's pore volume, but some embodiments limit the total solution volume below that needed to form a gel or slurry (about 90% to 400%, preferably about 100-200% of the pore volume).

Additionally, two or more different catalyst precursors may be placed on the same support using any of the support methods disclosed above. Likewise, two or more activators or an activator and a co-activator, may be placed on the same support.

Suitable solid particle supports are typically comprised of polymeric or refractory oxide materials, each being preferably porous. Any support material that has an average particle size greater than 10 μm may be used in this invention. In some cases, an extrudate form of the solid support with diameter of 0.1 mm to 0.5 mm and with length of 0.1 mm to 1 mm can also be used. Many other extrudate shapes, including honey-comb or quadrulope shapes, and sizes can also be used to enhance the polymerization process. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as an activator component. But additional activator may also be used. In some cases, a special family of solid support commonly known as MCM-41 can also be used. MCM-41 is a new class of unique crystalline support and can be prepared with tunable pore size and tunable acidity when modified with a second component. A detailed description of this class of materials and their modification can be found in U.S. Pat. No. 5,264,203.

The support material may be pretreated by any number of methods. For example, inorganic oxides may be calcined, chemically treated with dehydroxylating agents such as aluminum alkyls or alumoxanes, such as methylalumoxane, and the like, or both.

As stated above, polymeric carriers will also be suitable in accordance with the invention, see for example the descriptions in WO 95/15815 and U.S. Pat. No. 5,427,991. The methods disclosed may be used with the catalyst compounds, activators or catalyst systems of this invention to adsorb or absorb them on the polymeric supports, particularly if made up of porous particles, or may be chemically bound through functional groups bound to or in the polymer chains.

Useful catalyst carriers may have a surface area of from 10-700 $m^2/g$, and or a pore volume of 0.1-4.0 cc/g and or an average particle size of 10-500 μm. Some embodiments select a surface area of 50-500 $m^2/g$, and or a pore volume of 0.5-3.5 cc/g, and or an average particle size of 20-200 μm. Other embodiments select a surface area of 100-400 $m^2/g$, and or a pore volume of 0.8-3.0 cc/g, and or an average particle size of 30-100 μm. Useful carriers typically have a pore size of 10-1000 Angstroms, alternatively 50-500 çngstroms, or 75-350 çngstroms. The meso-metallocenes and or the meso-metallocene/activator combinations are generally deposited on the support at a loading level of 10-100 micromoles of catalyst precursor per gram of solid support; alternatively 20-80 micromoles of catalyst precursor per gram of solid support; or 40-60 micromoles of catalyst precursor per gram of support. But greater or lesser values may be used provided that the total amount of solid catalyst precursor does not exceed the support's pore volume.

The meso-metallocenes and or the meso-metallocene/activator combinations can be supported for bulk, slurry or fixed bed polymerization, or otherwise as needed. Numerous support methods are known for catalysts in the olefin polymerization art, particularly alumoxane-activated catalysts; all are suitable for use herein. See, for example, U.S. Pat. Nos. 5,057,475 and 5,227,440. An example of supported ionic catalysts appears in WO 94/03056. U.S. Pat. No. 5,643,847 and WO 96/04319A describe a particularly effective method. Both polymers and inorganic oxides may serve as supports, see U.S. Pat. Nos. 5,422,325, 5,427,991, 5,498,582 and 5,466,649, and international publications WO 93/11172 and WO 94/07928.

In another preferred embodiment, the meso-metallocene and or activator (with or without a support) are combined with an alkylaluminum compound, preferably a trialkylaluminum compound, prior to entering the reactor. Preferably the alkylaluminum compound is represented by the formula: $R_3Al$, where each R is independently a C1 to C20 alkyl group; preferably the R groups are independently selected from the group consisting of methyl, ethyl, propyl, isopropyl, butyl, isobutyl, n-butyl, pentyl, isopentyl, n-pentyl, hexyl, isohexyl, n-hexyl, heptyl, octyl, isooctyl, n-octyl, nonyl, isononyl, n-nonyl, decyl, isodecyl, n-decyl, undecyl, isoundecyl, n-undecyl, dodecyl, isododecyl, and n-dodecyl, preferably isobutyl, n-octyl, n-hexyl, and n-dodecyl. Preferably the alkylaluminum compound is selected from tri-isobutyl aluminum, tri n-octyl aluminum, tri-n-hexyl aluminum, and tri-n-dodecyl aluminum.

The catalyst compositions can be used individually, or can be mixed with other known polymerization catalysts to prepare polymer or oligomer blends. Monomer and catalyst selection allows polymer or oligomer blend preparation under conditions analogous to those using individual catalysts. Polymers having increased MWD are available from polymers made with mixed catalyst systems and can thus be achieved. Sometimes it is advantageous to produce fluids with increased MWD, which may improve the fluid blending properties. Mixed catalyst can comprise two or more catalyst precursors and or two or more activators.

Monomers

In a preferred embodiment the catalyst compounds described herein are used to polymerize or oligomerize any unsaturated monomer or monomers. Preferred monomers include the alpha-olefins of $C_3$ to $C_{24}$ olefins, preferably $C_3$ to $C_{20}$ olefins. In some embodiments preferred monomers include linear, branched or cyclic alpha-olefins, preferably $C_3$ to $C_{20}$ alpha-olefins, preferably $C_4$ to $C_{14}$ alpha-olefins, and more preferably $C_8$ to $C_{12}$ alpha-olefins. Preferred olefin monomers may be one or more of e.g., 1-butene, 1-pentene, 1-hexene, 1-heptene, 1-octene, 1-nonene, 1-decene, 1-dodecene, 3-methyl-1-butene, 4-methyl-1-pentene, and 1-tetradecene.

In a preferred embodiment, the process described herein may be used to produce homo-oligomers or co-oligomers (for the purposes of this invention and the claims thereto, a co-oligomer may comprise two, three, four, or more different monomer units). Preferred oligomers produced herein include homo-oligomers or co-oligomers of any of the above monomers of $C_3$ to $C_{20}$ alpha-olefins. In a preferred embodiment the oligomer is a homo-oligomer of any $C_8$ to $C_{12}$ alpha-olefin. Or in another preferred embodiment, the oligomer is a homo-oligomer of propylene, 1-butene, 1-pentene, 1-hexene, 1-heptene, 1-octene, 1-nonene, 1-decene, 1-undecene, or 1-dodecene. Preferably the oligomer is a homo-oligomer of 1-octene, 1-nonene, 1-decene. In another embodiment the oligomer is a co-oligomer comprising two or three or more monomers selecting from C3 to C20 alpha-olefins. For more information on the use of mixed feeds to prepare PAO's please see PCT US2006/027591, particularly page 8, paragraph [0029] to page 16, paragraph [044].

The alpha-olefins used to make PAOs include, but are not limited to, $C_3$ to $C_{24}$ alpha-olefins, with the $C_3$ to $C_{14}$ alpha-olefins, such as propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene and 4-phenyl-1-butene being preferred. A preferred group of polyalpha-olefins are polypropylene, poly-1butene, poly-1-pentene, poly-1-hexene, poly1-heptene, poly-1-octene, poly-1-nonene, poly-1-decene, poly1-undencen, poly-1-dodecene, poly-1-tridecene, and poly-1-tetradecene, although the dimers of higher olefins in the range of $C_{12}$ to $C_{18}$ can be present in the final products. Useful PAO's are preferably the oligomers or polymers with carbon numbers starting from $C_{20}$ and higher made from $C_3$ to $C_{20}$ alpha-olefins in one embodiment, and oligomers or polymers with carbon number starting from $C_{24}$ and higher made from $C_3$ to $C_{14}$ alpha-olefins in another embodiment. Suitable olefins include propylene, 1-butene, 1-pentene, 1-hexene, 1-heptene, 1-octene, 1-nonene, 1-decene, 1-undodecene and 1-dodecene, 1-tridecene, 1-tetradecene. In one embodiment, the olefin is propylene, and the polymer product is a mixture of pentamer and higher oligomers or polymers of propylene. In another embodiment, the olefin is 1-butene, and the PAO is a mixture of pentamers and higher oligomers of 1-butenes. In another embodiment, the olefin is 1-pentene, and the PAO is a mixture of tetramers and pentamers and higher of 1-pentene. In another embodiment, the olefin is 1-hexene, and the PAO is a mixture of tetramers and pentamers (and higher) of 1-hexene. In another embodiment, the olefin is 1-heptene, and the PAO is a mixture of trimers and tetramers and higher of 1-hepene. In another embodiment, the olefin is 1-octene, and the PAO is a mixture of trimers and tetramers and higher of 1-octene. In another embodiment, the olefin is 1-nonene, and the PAO is a mixture of trimers and tetramers and higher of 1-nonene. In another embodiment, the olefin is 1-decene, and the PAO is a mixture of dimer, trimers and tetramers and higher of 1-decene. In another embodiment, the olefin is 1-undecene, and the PAO is a mixture of trimers and tetramers and higher of 1-undecene. In another embodiment, the olefin is 1-dodecene, and the PAO is a mixture of dimer and trimers and higher of 1-dodecene.

In another embodiment, the monomers comprise propylene and/or butene, or combination of propylene and/or butene with another alpha-olefin, or other olefins, choosing from $C_5$ to $C_{20}$ alpha-olefins. When large linear alpha-olefins of C14 to C20 are used as feeds, it is preferably to use these large olefins in a mixture containing other linear alpha-olefins of C3 to C12. Polymers or oligomers made from these large alpha-olefins alone usually have high VI, but they also have high tendency to crystallize, thus degrading the low temperature fluidity of the fluid. It is usually more preferably to copolymerize these large alpha-olefins with smaller alpha-olefins of C3 to C12. The co-polymers will not crystallize or solidify as easily. Thus, the copolymers usually have excellent low temperature fluidity, high VI and other good lubricating properties.

In a preferred embodiment, the PAO comprises two or more monomers, alternatively three or more monomers, alternatively four or more monomers, alternatively five or more monomers. For example, a $C_3$, $C_4$, $C_6$, $C_{12}$-alpha-olefin mixture, a $C_3$, $C_{12}$-alpha-olefin mixture, a $C_3$, $C_{12}$, $C_{14}$-alpha-olefin mixture, a $C_4$, $C_{12}$-alpha-olefin mixture, a $C_4$, $C_{12}$, $C_{14}$-alpha-olefin mixture, a $C_4$, $C_{14}$-alpha-olefin mixture, a $C_6$, $C_{12}$-alpha-olefin mixture, a $C_6$, $C_{12}$, $C_{14}$-alpha-olefin mixture, a $C_5$, $C_{12}$, $C_{14}$-alpha-olefin mixture, a $C_6$, $C_{10}$, $C_{14}$-alpha-olefin mixture, a $C_6$, $C_8$, $C_{12}$-alpha-olefin mixture, a $C_8$, $C_{10}$, $C_{12}$-linear alpha-olefin mixture, or a $C_6$, $C_7$, $C_8$, $C_9$, $C_{10}$, $C_{11}$, $C_{12}$, $C_{13}$, $C_{14}$-linear alpha-olefin mixture, or a $C_4$, $C_6$, $C_8$, $C_{10}$, $C_{12}$, $C_{14}$, $C_{16}$, $C_{18}$-linear alpha-olefin mixture can be used as a feed.

In an alternate embodiment, the PAO comprises less than 40 wt % of ethylene. For copolymer with $C_3$ to $C_6$ alpha-olefins, sometimes, it is desirable to have some ethylene as one of the components. In this case, it is preferred to have 1 to 40 wt % ethylene present in the feed. In one alternative embodiment, the feed contains 40 wt % ethylene and 60 wt % 1-butene, or 30 wt % ethylene and 70 wt % 1-butene, or 20 wt % ethylene and 80 wt % 1-butene, 10 wt % ethylene and 90 wt % 1-butene, or 5 wt % ethylene and 95 wt % 1-butene, or 40 wt % ethylene and 60 wt % propylene, or 30 wt % ethylene and 70 wt % propylene, or 20 wt % ethylene and 80 wt % propylene, 10 wt % ethylene and 90 wt % propylene, 5 wt % ethylene and 95 wt % propylene. For copolymers with $C_7$ to $C_{18}$ alpha-olefins, it is preferred to have less amount of ethylene, 0 to 20 wt % ethylene is preferred.

In a preferred embodiment, any of the PAO's described herein may comprise at least 60 wt % 3 to 24 carbon atoms and from 0.5 to 40 wt % ethylene, where at least 80% of the ethylene present in the polyalpha-olefin is present in runs of 1 to 35 carbons or less as measured by carbon-13 NMR. Preferably any of the PAO's described herein may comprise at least 70 wt % 5 to 24 carbon atoms (preferably at least 80 wt %, preferably at least 85 wt %, preferably at least 90 wt %, preferably at least 95 mole %) and from 0.5 to 40 wt % ethylene, where at least 80% (preferably at least 85%, preferably at least 90%, preferably at least 95%, preferably at least 98%, preferably 100%) of the ethylene present in the polyalpha-olefin is present in runs of 1 to 35 carbons (preferably 1 to 30, preferably 1 to 25, preferably 1 to 20, preferably 1 to 15, preferably 1 to 10, preferably 1 to 5) as measured by carbon-13 NMR. Furthermore, the type of runs of ethylene sequence is random with no significant amount of very long poly-ethylene chain in the product.

The $C_4$ to $C_{20}$ alpha-olefins used herein can be produced directly from ethylene growth process as practiced by several commercial production processes, or $C_3$ to $C_{20}$ alpha-olefins can be produced from Fischer-Tropsch hydrocarbon synthesis from $CO/H_2$ syngas, or from metathesis of internal olefins with ethylene, or from cracking of petroleum wax or Fischer-Tropsch synthetic wax at high temperature, or any other alpha-olefin synthesis routes. A preferred feed for this invention is preferably at least 10 weight % alpha-olefin, preferably at least 20 weight % alpha-olefin, at least 50 weight % alpha-olefin, at least 70 weight % alpha-olefin, at least 80 weight % alpha-olefin (preferably linear alpha-olefin), at least 90 weight % alpha-olefin (preferably linear alpha-olefin), or 100% alpha-olefin (preferably linear alpha-olefin).

In one aspect, the olefinic feed components are present in at least 20 wt % or more based on the weight of the meso-metallocene, non-coordinating anion activator, co-activator, monomers, solvent, diluent and/or product. In another aspect, the olefinic feed components are present in at least 30 wt %, preferably 40 wt %, preferably 50 wt %, more preferably 60 wt %, even more preferably 70 wt %, preferably 80% and more preferably 90 wt % or more based on the weight of the meso-metallocene, non-coordinating anion activator, co-activator, monomers, solvent, diluent and/or product.

The olefins for the feed can be very dilute. For example, a suitable feed from a wax cracking reaction contains anywhere from 10 to 90 wt % alpha-olefins and can be used in the invention. Additionally, a feed stream from a Fischer-Tropsch synthesis process provides an alpha-olefin content that may range from 2 to 50 wt %. These are all suitable as feed olefins. However, alpha-olefin-containing mixtures can be used as feeds in this invention, even if the other components are internal-olefins, branched olefins, paraffins, cyclic paraffins, aromatics (such as toluene and or xylenes). These non-alpha-olefin components have diluent effects and are believed not to have a substantial detrimental effect on the polymerization of alpha-olefins. In other words, the processes described herein can selectively convert alpha-olefins in a mixture and leave the other components unreacted. This technology can be used to separate out alpha-olefins from a mixture by selectively reacting them with polymerization or oligomerization catalyst systems, thereby completely eliminating the need to separate alpha-olefins from the remainder of the components in a mixed feedstream. This is economically advantageous, for example, in a process utilizing Fischer-Tropsch synthesis olefin product streams containing alpha-olefins, internal-olefins, branched olefins and corresponding alkanes. Such a mixture can be utilized in concordance with the oligomerization technology as described herein and can selectively react with the alpha-olefin. No separate step to isolate the alpha-olefin is needed.

Another example of the utility of this process involves alpha-olefins produced by the metathesis of internal olefins with ethylene, which may contain some internal olefins. This mixed olefin feed can be reacted as is in the polymerization/oligomerization process of the present invention, which selectively converts the alpha-olefins into lube products. Thus one can use the alpha-olefin for the base stock synthesis without having to separate the alpha-olefin from internal olefin or other types of hydrocarbons. This can bring a significant improvement in process economics. The feed olefins can be the mixture of olefins produced from other linear alpha-olefin process containing $C_4$ to $C_{20}$ alpha-olefins as described in Chapter 3 "Routes to Alpha-Olefins" of the book Alpha Olefins Applications Handbook, Edited by G. R. Lappin and J. D. Sauer, published by Marcel Dekker, Inc. N.Y. 1989.

In a preferred embodiment, the PAO's produced herein may contain monomers having branches at least 2, preferably at least 3 carbons away from the alpha-unsaturation, such 4-methyl-1-decene, 4-ethyl-1-decene, or 4-methyl-1-hexene, 4-methyl-1-pentene, or 4-phenyl-1-butene, etc. These olefins may be present in the linear alpha-olefins from the manufacturing process or they can be added deliberately. The copolymers of slightly branched alpha-olefins with completely linear alpha-olefins have improved low temperature properties.

In one embodiment, when 1-butene is used as the feed or one of the feed olefins with other alpha-olefins, 1-butene can be pure 1-butene prepared from any of the commercial process. Alternatively, the 1-butene can be present as one of the components in a mixed $C_4$ stream that is readily available from a petrochemical complex or oil refinery operation. U.S. Pat. No. 5,859,159 A has a more detailed discussion of such $C_4$ streams, such as BB streams (butane-butene stream), or Raffinate 1 or Raffinate 2 streams. These mixed $C_4$ streams are available from steam cracking of light naphtha in the ethylene/propylene production processes, from MTBE processes where most of the iso-butene is removed, from the FCC—operation to produce $C_4$ streams, and/or from other petroleum refining processes. When these mixed $C_4$ streams are used as feed, only 1-butene will be reacted away by the catalyst system. Other $C_4$ components, cis-, trans-2-butenes, iso-butene, n-butane and iso-butane will only act as diluents, but will not react or interfere with the polymerization catalyst. These mixed $C_4$ streams are of interest and economical source for 1-butene to produce poly-1-butene, copolymer with ethylene or other high alpha-olefins of $C_5$ to $C_{20}$.

In another embodiment, when propylene is used as the feed, or as one of the feed olefins with other alpha-olefins, pure propylene from a chemical plant can be used. Alternatively, mixed propylene and propane streams (PP stream) can be used in the same manner. The propylene will selectively polymerize and the propane will act as a diluent and will not participate in the reaction. This PP stream may contain propylene in any amount from 10 wt % to 95 wt %. In another embodiment, mixture of PP (propylene/propane) and $C_4$ stream can be used as starting olefin or one of the starting olefin feeds. They can be used as a feed to produce copolymer of propylene-1-butene or with other higher alpha-olefins to produce ter-polymer or higher polymer liquids.

Polymerization/Oligomerization Process

Reactor Type and General Operations

Preferred reactors vary in size from 2 ml through 10,000 gallons (37,850 liters) or larger. Any size in between is possible. However, in practical applications, the reactor should be at least 1.5 liters to produce a product.

Alternatively, the reaction zone can be a tubular reactor, where catalyst system, feeds, solvents, recycles are fed into a long tube and the reaction takes place while traveling through the tube. The diameter of the tube, can generally range from one inch to 3 feet and the length of the tube can generally range from a few feet to over 1000 feet (305 m). The diameter and length of the tube can be used to control residence time, throughput, etc. the catalyst or any feed components can be injected at different intervals of the tube to maximize conversion and product yields.

Usually, it is preferable to use reactors larger than one liter in volume for commercial production. The production facility may have one single reactor or several reactors arranged in series or in parallel or in both to maximize productivity, product properties and general process efficiency. The reactors and associated equipments are usually pre-treated to ensure good reaction rates and catalyst performance. The reaction is usually conducted under inert atmosphere, where the catalyst system and feed components will not be in contact with any catalyst deactivator or poison which is usually polar oxygen, nitrogen, sulfur or acetylenic compounds.

Many polymerization/oligomerization processes and reactor types used for meso-metallocene-catalyzed polymerizations or oligomerizations such as solution, slurry, and bulk polymerization or oligomerization processed can be used in this invention. In some embodiments, if a solid or supported catalyst is used, a slurry or continuous fixed bed or plug flow process is suitable. In a preferred embodiment, the monomers are contacted with the meso-metallocene compound and the activator and/or co-activator/scavenger in the solution phase, bulk phase, or slurry phase, preferably in a continuous stirred tank reactor or a continuous tubular reactor.

The process can be carried out in a continuous stirred tank reactor or plug flow reactor, or more than one reactor operated in series or parallel. These reactors may have or may not have internal cooling and the monomer feed may or may not be refrigerated. See the general disclosure of U.S. Pat. No. 5,705,577 for general process conditions When a solid-supported catalyst is used for the conversion, a slurry polymerization/oligomerization process generally operates in the similar temperature, pressure and residence time range as described below. In a slurry polymerization or oligomerization, a suspension of solid catalyst, promoters, monomer and comonomers are added. The suspension including diluent is intermittently or continuously removed from the reactor. The catalyst is then separated from the product by filtration, centrifugation or settlement. The fluid is then subsequently distilled to remove solvent, any unreacted components, and light product. A portion of, or all of, the solvent and unreacted component or light components can be recycled for reuse.

If an un-supported solution catalyst is used, upon completion of the reaction or when the product is withdrawn from the reactor (such as in a CSTR), the product may still contain soluble, suspended or mixed catalyst components. These components are preferably deactivated or removed. Any of the usual catalyst deactivation methods or aqueous wash methods can be used to remove the catalyst component. Typically, the reaction is deactivated by addition of stoichiometric amount or excess of air, moisture, alcohol, isopropanol, etc. The mixture is then washed with dilute sodium hydroxide or with water to remove catalyst components. The residual organic layer is then subjected to distillation to remove solvent and unconverted olefins, which can be recycled for reuse or further conversion of un-reacted olefins into lubes. The distillation can further remove any light reaction products from C18 to C3 and less. These light components can be used as a diluent for further reaction. Or they can be used as olefinic raw material for other chemical synthesis, as these light olefin product have vinylidene unsaturation, most suitable for further functionalization and for conversion to high performance fluids. Alternatively, these light olefin products can be hydrogenated for use as high quality paraffinic solvents.

Typically, in the processes of this invention, one or more transition metal compounds, one or more activators, co-activators or scavengers, and one or more monomers are contacted to produce polymer or oligomer. These catalysts may be supported and as such will be particularly useful in the known slurry, solution, or bulk operating modes conducted in single, series, or parallel reactors. If the catalyst, activator or co-activator is a soluble compound, the reaction can be carried out in a solution mode. Even if one of the components is not completely soluble in the reaction medium or in the feed solution, either at the beginning of the reaction or during or at the later stages of the reaction, a solution or slurry type operation is still applicable. In any instance, the catalyst components, dissolved or suspended in solvents, such as toluene or other conveniently available aromatic solvents, or in aliphatic solvent, or in the feed alpha-olefin stream, are fed into the reactor under inert atmosphere (usually nitrogen or argon blanketed atmosphere) to allow the polymerization or oligomerization to take place. The polymerization or oligomerization can be run in a batch mode, where all the components are added into a reactor and allowed to react to a pre-designed degree of conversion, either to partial conversion or full conversion. Subsequently, the catalyst is deactivated by any possible means, such as exposure to air or water, or by addition of alcohols or solvents containing deactivating agents, or by addition of solid sorbants. The catalyst components can then be separated by conventional aqueous wash or by filtration as in the case when solid sorbant is used. The polymerization or oligomerization can also be carried out in a semi-continuous operation, where feeds and catalyst system components are continuously and simultaneously added to the reactor so as to maintain a constant ratio of catalyst system components to feed olefin(s). When all feeds and catalyst components are added, the reaction is allowed to proceed to a pre-determined stage. The reaction is then discontinued by catalyst deactivation in the same manner as described for batch operation. The polymerization or oligomerization can also be carried out in a continuous operation, where feeds and catalyst system components are continuously and simultaneously added to the reactor so to maintain a constant ratio of catalyst system and feed olefins. The reaction product is continuously withdrawn from the reactor, as in a typical continuous stirred tank reactor (CSTR) operation. The residence times of the reactants are controlled by a pre-determined degree of conversion and catalyst concentration. The withdrawn product is then typically quenched in the separate reactor in a similar manner as other operation. In a preferred embodiment, any of the processes to prepare PAO's described herein are continuous processes. Preferably, the continuous process comprises the steps of a) continuously introducing a feed stream comprising at least 10 mole % of the one or more $C_3$ to $C_{24}$ alpha-olefins into a reactor, b) continuously introducing the meso-metallocene compound and the activator into the reactor, and c) continuously withdrawing the polyalpha-olefin from the reactor.

Effect of Hydrogen

In another embodiment, the process comprises the step of maintaining a partial pressure of hydrogen in the reactor of 0.1 to 60 psi (0.69 to 414 kPa), based upon the total pressure of the reactor, preferably 0.5 to 50 psi (3.5 to 345 kPa) preferably 1.0 to 40 psi (6.9 to 276 kPa), preferably 2.0 to 30 psi (13.8 to 207 kPa) preferably 3 to 20 psi (20.7 to 137.9 kPa) or less, preferably 5 to 15 psi (34.5 to 103.5 kPa), preferably 1 to 10 psi (6.9 to 69 kPa). Alternatively the hydrogen, if present, is present in the reactor at 1 to 30,000 ppm by weight, preferably 3,000 ppm or less, preferably 150 ppm or less, preferably 750 ppm or less, preferably 500 ppm or less, preferably 250 ppm or less, preferably 100 ppm or less, preferably 50 ppm or less, preferably 25 ppm or less, preferably 10 ppm or less, preferably 5 ppm or less. During the oligomerization or polymerization reaction, little or no hydrogen is consumed. Therefore the excess hydrogen gas can be recycled after the reaction is completed.

Reactor Total Pressure

In another embodiment, if ethylene is present in the reactor, the ethylene partial pressure is usually maintained at below 1000 psi (6897 kPa), or preferably below 500 psi (2449 kPa), or preferably below 200 psi (1379 kPa), or preferably below 50 psi (345 kPa), or preferably below 30 psi (207 kPa), or preferably below 10 psi (69 kPa). In another embodiment, if propylene, PP stream, C4 stream, 1-butene, or 1-pentene is present in the reactor, the total partial pressure of these components is usually maintained at below 1000 psi (6897 kPa), or preferably below 500 psi (2449 kPa), or preferably below 200 psi (1379 kPa), or preferably below 50 psi (345 kPa), or preferably below 30 psi (207 kPa), or preferably below 10 psi (69 kPa). The suitable light olefin partial pressure is to ensure that proper amount of olefins are delivered into the reactor system or the proper ratio of ethylene or propylene or butene or the combination of these olefins to other olefin feeds to the system is maintained. As discussed above, the total reactor pressure may be higher than the total partial pressure of the gaseous feeds by the presence of other inert gas, such as nitrogen or argon.

Catalyst Addition Options

One or more reactors in series or in parallel may be used in the present invention. The transition metal compound, activator and when required, co-activator, may be delivered as a solution or slurry in a solvent or in the alpha-olefin feed stream, either separately to the reactor, activated in-line just prior to the reactor, or preactivated and pumped as an activated solution or slurry to the reactor. Polymerizations/oligomerizations are carried out in either single reactor operation, in which monomer, or several monomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors. In one preferred embodiment, the precatalyst is activated in the reactor in the presence of olefin. In another embodiment, the precatalyst such as the dichloride form of the meso-metallocenes is pre-treated with alkylaluminum reagents, especially, triisobutylaluminum, tri-n-hexylaluminum and/or tri-n-octylaluminum, etc., followed by charging into the reactor containing other catalyst component and the feed olefins, or followed by activation with the other catalyst component to give the fully activated catalyst, which is then fed into the reactor containing feed olefins. In another alternative, the pre-catalyst meso-metallocene is mixed with the activator and/or the co-activator and this activated catalyst is then charged into reactor, together with feed olefin stream containing some scavenger or co-activator. In another alternative, the whole or part of the co-activator is pre-mixed with the feed olefins and charged into the reactor at the same time as the other catalyst solution containing meso-metallocene and activators and/or co-activator.

Poison Scavenger

In some embodiments, a small amount of poison scavenger, which can be the same or different from the co-activator, such as trialkylaluminum (trimethylaluminum, triethylaluminum, triisopropylaluminum, triisobutylaluminum, tri-n-hexylaluminum, tri-n-octylaluminum) or methylalumoxane is added to the feed olefin stream to further improve catalyst activity. In a preferred embodiment, the monomers are contacted with an alkylaluminum compound, preferably a trialkylaluminum compound, prior to being introduced into the reactor. In another preferred embodiment, the meso-metallocene and or activator are combined with an alkylaluminum compound, preferably a trialkylaluminum compound, prior to entering the reactor.

Typically, the scavenging compound will be an organometallic compound such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethylaluminum, triethylborane, tri-iso-butylaluminum, diisobutylaluminum hydride, methylalumoxane, iso-butylalumoxane, and tri-n-octylaluminum. Those scavenging compounds having bulky or $C_1$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. Preferably the alkylaluminum compound is selected from tri-isobutylaluminum, tri n-octylaluminum, tri-n-hexylaluminum, and tri-n-dodecylaluminum. Alumoxanes also may be added in scavenging quantities with other activators, e.g., methylalumoxane, $[Me_2HNPh]^+[B(pfp)_4]^-$ or $B(pfp)_3$, where pfp is perfluorophenyl ($C_6F_5$), Me is methyl and Ph is phenyl.

Feed Purification

In one embodiment of any of the processes described herein the feed olefins and or solvents are treated to remove catalyst poisons, such as water or moisture, peroxides, oxygen- or nitrogen-containing organic compounds or acetylenic compounds. The feed olefins, the solvents if used, or the purge gas (usually nitrogen) are purified by typical feed purification techniques. In the case of a liquid feed, the liquid is usually degassed under a vacuum of for a period of 1 to 60 minutes to remove any dissolved gases. Alternatively, the feed olefins, solvents or purging gases are purified by passing through an activated molecular sieve (3A, 4A, 5A or 13X molecular sieve) or commercial absorbing beds made of activated alumina, silica or other purifying solids. These purifying solids can remove trace water, alcohols, nitrogen compounds, or any other polar impurities. Alternatively, the feed olefins, solvents or purging gas are purified by passing through an activated oxygenate-removal solid catalyst (de-ox catalyst), which usually contains copper, chromium and/or other metal oxides in reduced oxidation states. U.S. Pat. No. 6,987,152 describes the examples of the feed purification. Depending on the feed quality and the desired feed purity, one or two or all methods described above can be used in combination to obtain best results.

Typically, in this invention, such treatment will increase catalyst productivity at least 20% to 1000% or more as compared to systems absent such treatment. The improved process also includes special treatment of the feed olefins to remove catalyst poisons, such as peroxides, oxygen-, sulfur- or nitrogen-containing organic compounds or other trace impurities. This treatment can increase catalyst productivity substantially (typically more than 10-fold). Preferably the feed olefins are contacted with a molecular sieve, activated alumina, silica gel, oxygen-removing catalyst, and or purifying clays to reduce the heteroatom-containing compounds in the feed, preferably below 50 ppm, preferably below 10 ppm.

Generally, when using meso-metallocene catalysts, after pre-treatment of feed olefins, solvents, diluents and after precautions to keep the catalyst component stream(s) and reactor free of impurities, the reaction should proceed well. In some embodiments, when using meso-metallocene catalysts, particularly when they are immobilized on a support, the complete catalyst system will additionally comprise one or more scavenging compounds. Here, the term scavenging compound means a compound that removes polar impurities from the reaction environment. These impurities adversely affect catalyst activity and stability. Typically, purifying steps are usually used before introducing reaction components to a reaction vessel. But such steps will rarely allow polymerization or oligomerization without using some scavenging compounds. Normally, the polymerization process will still use at least small amounts of scavenging compounds (such as those described above).

Reaction Temperature

The PAO's described herein can also be produced in homogeneous solution or bulk processes. Generally this involves polymerization or oligomerization in a continuous reactor in which the polymer formed and the starting monomer and catalyst materials supplied, are agitated to reduce or avoid concentration or temperature gradients. Temperature control in the reactor is generally obtained by balancing the heat of polymerization and with reactor cooling by reactor jackets or cooling coils or a cooled side-stream of reactant to cool the contents of the reactor, auto refrigeration, pre-chilled feeds, vaporization of liquid medium (diluent, monomers or solvent) or combinations of the above. Adiabatic reactors with pre-chilled feeds may also be used. The reactor temperature depends on the catalyst used and the product desired. For one catalyst systems, generally higher temperatures tend to give lower molecular weights and lower temperatures tend to give higher molecular weights In general, the reactor temperature preferably can vary between −10° C. to 250° C., preferably from 10° C. to 220° C., preferably from 20° C. to 180° C., preferably from 30° C. to 170° C.

Generally, it is of interest to control the reaction temperature as tightly as possible within a pre-determined band. In order to produce fluids with narrow molecular weight distribution, such as to promote the highest possible shear stability, it is useful to control the reaction temperature to obtain minimum temperature fluctuation throughout the reactor with minimal variation over the course of the reaction time. If multiple reactors are used in series or in parallel, it is useful to keep the temperature constant within a pre-determined value band to minimize any broadening of the molecular weight distribution. In order to produce fluids with a broad molecular weight distribution, one can adjust the reaction temperature, swing profile, or fluctuation; or as in series operation, the second reactor temperature is preferably different than the first reactor temperature. In parallel reactor operation, the temperatures of the two reactors are independent. Alternatively, the MWD can also be intentionally broadened by using multiple types of meso-metallocene catalysts.

Reaction Pressure

The total reactor pressure in any reactor used herein can vary from about 0.1 atmosphere to 100 atmospheres (1.5 psi to 1500 psi), preferably from 0.5 bar atm to 75 atm (8 psi-1125 psi), most preferably from 1.0 to 50 atm (15 psi to 750 psi). The reaction can be carried out under an atmosphere of nitrogen, or with some hydrogen or sometimes with a partial pressure from other volatile components, such as propylene, PP stream, 1-butene, $C_4$ streams, 1-pentene, etc. Sometimes a small amount of hydrogen is added to the reactor to improve the catalyst productivity. The amount of hydrogen is preferably kept at such a level for improving catalyst productivity, but not high enough to induce any hydrogenation of olefins,—especially the feed alpha-olefins because the conversion of alpha-olefins into saturated paraffins is very detrimental to the efficiency of the process.

Residence Time

The reaction time or reactor residence time is usually dependent on the type of catalyst used, the amount of catalyst used, and the desired conversion level.

Usually the amount of catalyst components used is determinative. High amounts of catalyst loading tends to gives high conversion at short reaction time. However, high amount of catalyst usage makes the production process uneconomical and difficult to manage the reaction heat and to control the reaction temperature. Therefore, it is useful to choose a catalyst with maximum catalyst productivity to minimize the amount of meso-metallocene and the amount of activators needed. When the catalyst system is meso-metallocene plus a Lewis acid or an ionic promoter with NCA component, the meso-metallocene used is typically in the range of 0.01 microgram to 500 micrograms (or 0.5 milligram) of meso-metallocene component/gram of alpha-olefin feed. Usually the preferred range is from 0.1 microgram to 100 microgram of meso-metallocene component per gram of alpha-olefin feed. Furthermore, the molar ratio of the NCA activator to meso-metallocene is in the range from 0.1 to 10, preferably 0.5 to 5, preferably 0.5 to 3. If a co-activator of alkylaluminum compound is used, the molar ratio of the Al to meso-metallocene is in the range from 1 to 1000, preferably 2 to 500, preferably 4 to 400.

Typically one prefers to have the highest possible conversion (close to 100%) of feed alpha-olefin in the shortest possible reaction time. However, in CSTR operation, it is sometimes beneficial to run the reaction at an optimum conversion, which is less than 100% conversion. There are also occasions, when partial conversion is more desirable or when the narrowest possible MWD of the product is desired, because partial conversion can avoid a broadening of the MWD. If the reaction is conducted to less than 100% conversion of the alpha-olefin, the unreacted starting material after separation from other product and solvents/diluents can be recycled to increase the total process efficiency.

Desirable residence times for any process described herein are in the range between 1 minutes to 30 hours, more preferably from 5 minutes to 16 hours, more preferably from 10 minutes to 10 hours.

Solvent or Diluent

Each of these processes may also be employed in single reactor, parallel, or series reactor configurations. The liquid processes comprise contacting olefin monomers with the above-described catalyst system(s) in a suitable diluent or solvent and allowing said monomers to react for a sufficient time to produce the desired polymers or oligomers. Both aliphatic and aromatic hydrocarbon solvents are suitable. Aromatics such as toluene, xylenes, ethylbenzene, propylbenzene, cumene, t-butylbenzene are suitable. Alkanes, such as hexane, heptane, pentane, isopentane, and octane, Norpar or Isopar solvents (from ExxonMobil Chemical Company in Houston, Tex.) are also suitable. Generally, toluene is best suited to dissolve the catalyst components. Norpar, Isopar or hexanes are preferred as reaction diluents. Oftentimes, a mixture of toluene and Norpar, or toluene and Isopar, is used as a diluent or solvent. For process simplicity and high reactor efficiency, it is preferred to add as little as possible solvent or diluent into the reactor. Sometimes for high viscosity fluid production at low temperature, a solvent or diluent is added to facilitate reaction heat transfer, stirring, product handling, filtration, etc. Usually, less than 50 wt % extra solvent or diluent is added in the reactor, preferably less than 30 wt %, preferably less than 20 wt %, preferably less than 10 wt %, preferably no solvent is added to the reactor system. The reaction systems usually have a small amount of solvent or diluent carried over from the catalyst, activator or co-activator/scavenger solutions.

The process described above in the absence of hydrogen or in the presence of a very small amount of hydrogen is advantageous to provide polymers or oligomers with a high degree of unsaturated double bonds. These double bonds can be easily converted into functionalized fluids with multiple performance features. Examples for converting these polymers with MW greater than 300 can be found in the preparation of ashless dispersants, where the polymers are reacted with maleic anhydride to give PAO-succinic anhydride which can then be reacted with amines, alcohols, polyether alcohols and converted into dispersants, detergents or other functional additives. Examples for such conversion can be found in the book "Lubricant Additives: Chemistry and Application," ed. By Leslie R. Rudnick, Marcel Dekker, Inc. 2003, p. 143-170.

In another embodiment, any of polyalphaolefins produced herein is hydrogenated. In particular the polyalpha-olefin is preferably treated as described above to reduce heteroatom containing compounds to less than 600 ppm, and then contacted with hydrogen and a hydrogenation catalyst to produce a polyalpha-olefin having a bromine number less than 2. In a preferred embodiment, the treated polyalpha-olefin comprises 100 ppm of heteroatom containing compounds or less, preferably 10 ppm of heteroatom containing compounds or less. (A heteroatom containing compound is a compound containing at least one atom other than carbon and hydrogen.) Preferably the hydrogenation catalyst is selected from the group consisting of supported Group 7, 8, 9, and 10 metals, preferably the hydrogenation catalyst selected from the group consisting of one or more of Ni, Pd, Pt, Co, Rh, Fe, Ru, Os, Cr, Mo, and W, supported on silica, alumina, clay, titania, zirconia, or mixed metal oxide supports or a mesoporous material, typical known as MCM-41 material or related material (as described in U.S. Pat. No. 5,264,203). A preferred hydrogenation catalyst is nickel supported on kieselguhr, or platinum or palladium supported on alumina or MCM-41, or cobalt-molybdenum supported on alumina. Usually, a high nickel content catalyst, such as 60% Ni on Keiselguhr catalyst is used, or a supported catalyst with a high amount of Co—Mo loading. Alternatively, the hydrogenation catalyst is nickel supported on keisleghur, silica, alumina, clay or silica-alumina. Alternatively, the catalyst is Pd or Pt supported on MCM-41 or a related material.

In a preferred embodiment the polyalpha-olefin is contacted with hydrogen and a hydrogenation catalyst at a temperature from 25° C. to 350° C., preferably 100° C. to 300° C. In another preferred embodiment the polyalpha-olefin is contacted with hydrogen and a hydrogenation catalyst for a time period from 5 minutes to 100 hours, preferably from 5 minutes to 24 hours. In another preferred embodiment the polyalpha-olefin is contacted with hydrogen and a hydrogenation catalyst at a hydrogen pressure of from 25 psi to 2500 psi, preferably from 100 to 2000 psi. In another preferred embodiment the hydrogenation process reduces the number of mm triad groups in a polyalpha-olefin by 1 to 80%. For further information on hydrogenation of PAO's please see U.S. Pat. No. 5,573,657 and "Lubricant Base Oil Hydrogen Refining Processes" (page 119 to 152 of Lubricant Base Oil and Wax Processing, by Avilino Sequeira, Jr., Marcel Dekker, Inc., NY, 1994) which disclose more information on hydrogenation of PAO's.

This hydrogenation process can be accomplished in a slurry reactor in a batch operation, or in a continuous stirred tank reactor (CSTR), where the hydrogenation catalyst is at a level of 0.001 wt % to 20 wt % of the PAO feed, or preferably 0.01 wt % to 10 wt % of the PAO feed. Hydrogen and the polyalpha-olefins are continuously added to the reactor to allow for a certain chosen residence time, usually 5 minutes to 10 hours, to allow complete hydrogenation of the unsaturated olefins. The amount of catalyst added is usually very small, just high enough to compensate for the catalyst deactivation. The catalyst and hydrogenated PAO are continuously withdrawn from the reactor. The product mixture is then filtered, centrifuged or settled to remove the solid hydrogenation catalyst. The catalyst can be regenerated and reused. The hydrogenated PAO can be used as is, or further distilled or fractionated to a particular component composition if necessary. In some cases, when the hydrogenation catalyst shows no catalyst deactivation over long term operation, a stir tank hydrogenation process can be carried out in a manner where a fixed amount of catalyst is maintained in the reactor, usually 0.1 wt % to 10% of the total reactants, and only hydrogen and PAO feed need to be continuously added at a feed rate and only hydrogenated PAO is withdrawn from the reactor.

The hydrogenation process can also be accomplished by a fixed bed process, in which the solid catalyst is packed inside a tubular reactor and heated to reactor temperature. Hydrogen and PAO feed can be fed through the reactor simultaneously from the top or bottom or countercurrently to maximize the contact between hydrogen, PAO and catalyst and to allow best heat management. The feed rate of the PAO and hydrogen are adjusted to give appropriate residence to allow complete hydrogenation of the unsaturated olefins in the feed and/or to allow a desirable conversion of mm triads in the process. The hydrogenated PAO fluid can be used as is or further distilled or fractionated to give the right component, if necessary. Usually, the finished hydrocarbon PAO fluids have bromine number less than 2.

The new poly-alpha-olefins when used alone or blended with other fluids have unique lubrication properties.

In another embodiment, a novel lubricant of the present invention comprises the PAO's produced in this invention, together with one or more other base stocks, including Group I to Group VI base stocks with viscosity range from 1.5 to 100 cSt at 100° C. to formulate suitable viscosity grades. In addition, additives of one or more of: thickeners, VI improvers, antioxidants, anti-wear additives, detergent/dispersant/inhibitor (DDI) packages, and/or anti-rust additives may be added. In a preferred embodiment the PAO's produced herein are combined with one or more of dispersants, detergents, friction modifiers, traction improving additives, demulsifiers, defoamants, chromophores (dyes), and/or haze inhibitors. These fully formulated lubricants can be used in automotive crank case oil (engine oil), industrial oil, grease, hydraulic, gear oils, heat transfer fluids or gas turbine engine oils. These are examples of additives used in finished lubricant formulations. Additional information on the use of PAO's in the formulations of full synthetic, semi-synthetic or part synthetic lubricant or functional fluids can be found in "Synthetic Lubricants and High-Performance Functional Fluids", 2nd Ed. L. Rudnick, etc. Marcel Dekker, Inc., N.Y. (1999). Additional information on additives used in product formulation can be found in "Lubricants and Lubrications, Ed. By T. Mang and W. Dresel, by Wiley-VCH GmbH, Weinheim 2001.

The following paragraphs enumerated consecutively from 1 through 16 provide for various aspects of the present invention. In one embodiment, in a first paragraph (1), the present invention provides a process to produce a liquid poly-alpha-olefin comprising:

a) contacting in a reaction zone, in the presence of from 0 to 60 psi (414 kPa) hydrogen, (e.g. a 0 to 60 (0 to 414 kPa) psi partial pressure, based upon total of the gases present in the reactor for a gas phase process or in the head space that are in equilibrium with the reactor contents for a solution, bulk, or slurry phase process), one or more C3 to C20 alpha-olefin monomers with a non-coordinating anion activator, a single bridged meso-metallocene transition metal compound having less than about 35 wt % racemic isomer, and a co-activator selected from the group consisting of alkyl aluminum compounds and alkyl alumoxanes, provided that when the alkyl alumoxane is present in a molar ratio of less than 0.1:1 of alkylalumoxane to meso-metallocene, and provided that when the alkyl aluminum compound is present at a molar ratio of alkyl aluminum to meso-metallocene of from 2:1 to 10,000 to 1, where the molar ratio of activator to meso-metallocene is from 10:1 to 0.1:1, and provided that ethylene is not present at more than 30 volume % of the monomers entering the reaction zone, provided that the alpha-olefin monomers in the feed components are present in at least 20 wt % or more based upon the weight of the meso-metallocene, non-coordinating anion activator, co-activator, monomers, and solvent or diluent, and where:

i) the productivity of the process is at least 50,000 g of total product per gram of transition metal compound (where the total product is defined to be the total amount of product exiting the reactor, minus unreacted monomers and solvents); and ii) no more than 5% monomer is converted from olefin to alkane; and b) obtaining a liquid polyalphaolefin product having a pour point of less than 25° C., a $KV_{100}$ of 2 cSt or 3 cSt to 6000 cSt, 20 weight percent dimer or less and a viscosity index of 60 or more.

2. The process of paragraph 1, wherein the meso-metallocene is defined as (Cp-A'-Cp*)$MX_1X_2$ wherein:

M is the metal center, and is a Group 4 metal preferably titanium, zirconium or hafnium, preferably zirconium or hafnium;

Cp and Cp* are the same or different cyclopentadienyl rings that are each bonded to M, and substituted with from zero to four substituent groups S" being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent S" groups are optionally joined to form a substituted or unsubstituted, saturated, partially unsaturated, or aromatic cyclic or polycyclic substituent;

A' is a bridging group;

$X_1$ and $X_2$ are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or when Lewis-acid activators, such as methylalumoxane, which are capable of donating an X ligand as described above to the transition metal component are used, both X may, independently, be a halogen, alkoxide, aryloxide, amide, phosphide or other univalent anionic ligand or both X can also be joined to form a anionic chelating ligand.

3. The process of paragraph 2, wherein M is titanium, zirconium or hafnium.

4. The process of any of paragraphs 1 through 3, wherein the $K_v100$ is 150 or more.

5. The process of any of paragraphs 1 through 3, wherein the $K_v100$ is 300 or more.

6. The process of any of paragraphs 1 through 3, wherein the $K_v100$ is 600 or more.

7. The process of any of paragraphs 1 through 6, wherein the pour point is −110° C. or less.

8. The process of any of paragraphs 1 through 7, wherein no more than 10% monomer is converted from olefin to alkane.

9. The process of any of paragraphs 1 through 8, wherein the yield of product is greater than 95%.

10. The process of any of paragraphs 1 through 9, wherein more than 95 wt % of the total product has greater than 18 carbon atoms 11. The process of any of paragraphs 1 through 10, wherein the process is continuous or semi-continuous.

12. The process of any of paragraphs 1 through 11, wherein the meso-metallocene is meso-dimethylsilylbis(2-methylindenyl)zirconium dihalide or mesoethylenebis(indenyl)zirconium dihalide.

13. The process of any of paragraphs 1 through 11, wherein the meso-metallocene is meso-dimethylsilylbis(2-methylindenyl)zirconium dialkyl or mesoethylenebis(indenyl)zirconium dialkyl.

14. The process of any of paragraphs 1 through 11, wherein the co-activator is represented by the formula: $R'_3Al$, where each R' is, independently, selected from the group consisting of methyl, ethyl, n-propyl, iso-propyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecyl, n-hexadecyl, n-heptadecyl, n-octadecyl, and their iso-analogs.

15. The process of any of paragraphs 1 through 14, wherein the non-coordinating anion activator is N,N-dimethylanilinium tetrakis(pentafluorophenyl)borate, N,N-dialkylphenylanilinium tetrakis(pentafluorophenyl)borate, trityl tetrakis(pentafluorophenyl)borate, tris(pentafluorophenyl)boron, tri-alkylammonium tetrakis(pentafluorophenyl)borate, tetra-alkylammonium tetrakis(pentafluorophenyl)borate, N,N-dimethylanilinium tetrakis(perfluoronapthyl)borate, N,N-dialkylphenylanilinium tetrakis(perfluoronapthyl)borate, trityl tetrakis(perfluoronapthyl)borate, tris(perfluoronapthyl)boron, tri-alkylammonium tetrakis(perfluoronapthyl)borate, or tetra-alkylammonium tetrakis(perfluoronapthyl)borate.

16. The process of any of paragraphs 1 through 15, wherein the monomers are one or more of are selected from the group consisting of propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-uneicosene, 1-docosene, 1-tricosene, 1-tetracosene, 1-pentacosene, 1-hexacosene, 4-methyl-1-pentene, 4-phenyl-1-butene, and 5-phenyl-1-pentene.

In another embodiment this invention relates to:

17. A process to produce a liquid poly-alpha-olefin comprising:

a) contacting in a reaction zone, optionally in the presence of up to 55 psi hydrogen, one or more C5 to C18 alpha-olefin monomers with a non-coordinating anion activator, a meso-metallocene transition metal compound, where the compound has less than 15 wt % rac isomer, and an co-activator selected from the group consisting of alkyl aluminum compounds ($AlR_3$, R=C1 to C20 hydrocarbyl) and alkyl alumoxanes (provided the alkyl alumoxane is present in a molar ratio of less than 0.1:1 of alkylalumoxane to metallocene, where the molar ratio of activator to metallocene is from 10:1 to 0.1:1 and the molar ratio of co-activator to metallocene is from 2:1 to 10:000 to 1, and provided that ethylene and or propylene are not present at more than 30 volume % of the monomers entering the reaction zone and the C5 to C18 monomers are present at least 70 volume % enter the reactor (based upon all the monomers present) and where:

i) the productivity of the process is at least 40,000 g of total fractionated product per gram of transition metal compound; and ii) the temperature in the reaction zone does not rise by more than 10° C. during the reaction period;

iii) no more than 5% of the olefin monomer is converted from alkene to alkane;

iv) yield is greater than 95%;

v) selectivity to C20 and above product is at least 95% and b) obtaining a liquid polyalphaolefin product having 20 wt % dimer or less, a KV100 of 3 to 1000 cSt, a viscosity index of 100 or more, and a pour point of −10° C. or less.

18. The process of paragraph 17, wherein the meso-metallocene is defined as $(Cp-A'-Cp^*)MX_1X_2$ wherein:

M is the metal center, and is a Group 4 metal preferably titanium, zirconium or hafnium, preferably zirconium or hafnium;

Cp and Cp* are the same or different cyclopentadienyl rings that are each bonded to M, and substituted with from zero to four substituent groups S" being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent S" groups are optionally joined to form a substituted or unsubstituted, saturated, partially unsaturated, or aromatic cyclic or polycyclic substituent;

A' is a bridging group;

$X_1$ and $X_2$ are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or when Lewis-acid activators, such as methylalumoxane, which are capable of donating an X ligand as described above to the transition metal component are used, both X may, independently, be a halogen, alkoxide, aryloxide, amide, phosphide or other univalent anionic ligand or both X can also be joined to form a anionic chelating ligand.

19. The process of paragraph 18, wherein M is titanium, zirconium or hafnium.

20. The process of any of paragraphs 17 through 19, wherein the $K_v100$ is 150 or more.

21. The process of any of paragraphs 17 through 19 wherein the KV100 is 300 or more.

22. The process of any of paragraphs 17 through 19, wherein the KV100 is 600 or more.

23. The process of any of paragraphs 17 through 22, wherein the pour point is −10° C. or less.

24. The process of any of paragraphs 17 through 23, wherein no more than 10% monomer is converted from olefin to alkane.

25. The process of any of paragraphs 17 through 24, wherein the yield of product is greater than 95%.

26. The process of any of paragraphs 17 through 25, wherein more than 95 wt % of the total product has greater than 18 carbon atoms 27. The process of any of paragraphs 17 through 26, wherein the process is continuous or semi-continuous.

28. The process of any of paragraphs 17 through 27, wherein the meso-metallocene is meso-dimethylsilylbis(2-methylindenyl)zirconium dihalide or mesoethylenebis(indenyl)zirconium dihalide.

29. The process of any of paragraphs 17 through 27, wherein the meso-metallocene is meso-dimethylsilylbis(2-methylindenyl)zirconium dialkyl or mesoethylenebis(indenyl)zirconium dialkyl.

30. The process of any of paragraphs 17 through 27, wherein the co-activator is represented by the formula: $R'_3Al$, where each R' is, independently, selected from the group consisting of methyl, ethyl, n-propyl, iso-propyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecyl, n-hexadecyl, n-heptadecyl, n-octadecyl, and their iso-analogs.

31. The process of any of paragraphs 17 through 30, wherein the non-coordinating anion activator is N,N-dimethylanilinium tetrakis(pentafluorophenyl)borate, N,N-dialkylphenylanilinium tetrakis(pentafluorophenyl)borate, trityl tetrakis(pentafluorophenyl)borate, tris(pentafluorophenyl)boron, tri-alkylammonium tetrakis(pentafluorophenyl)borate, tetraalkylammonium tetrakis(pentafluorophenyl)borate, N,N-dimethylanilinium tetrakis(perfluoronapthyl)borate, N,N-dialkylphenylanilinium tetrakis(perfluoronapthyl)borate, trityl tetrakis(perfluoronapthyl)borate, tris(perfluoronapthyl)boron, tri-alkylammonium tetrakis(perfluoronapthyl)borate, or tetra-alkylammonium tetrakis(perfluoronapthyl)borate.

32. The process of any of paragraphs 17 through 31, wherein the monomers are one or more of are selected from the group consisting of propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-uneicosene, 1-docosene, 1-tricosene, 1-tetracosene, 1-pentacosene, 1-hexacosene, 4-methyl-1-pentene, 4-phenyl-1-butene, and 5-phenyl-1-pentene.

EXAMPLES

Kinematic viscosity at 40 and 100° C. in cSt was determined by ASTM D 445 method; pour point was determined by ASTM D 97 method; and viscosity index (VI) was determined according to ASTM D 2270.

The following examples are for purposes of illustration only and are non-limiting examples.

The 1-decene used for all of the experiments was purified by mixing 1 liter of untreated raw material with 20 grams of activated 13X molecular sieve, (which was activated by calcining at 200° C. for at least four hours under a stream of purging dry nitrogen gas), and 10 grams of Oxi-Clear catalyst (purchased from Altech Associates, Inc of Deerfield, Ill. 60115) for at least two days inside a glove box under a dry, inert atmosphere of nitrogen. The molecular sieve and de-oxygenation catalyst were then removed by filtration in the glove box to provide purified 1-decene. Alternatively, the feeds were purified by passing through a bed of activated 13X molecular sieve alone under nitrogen atmosphere.

In all examples, the stock solution of metallocenes or non-coordinating anion were prepared by dissolving the compounds in purified toluene to give a concentration of 1 mg per gram of solution. TIBA stock solution was similarly prepared to have a concentration of 20 mg per gram of solution.

Example 1

A reaction flask containing 50 gram purified 1-decene and 3.173 g TIBA stock solution was heated to 35° C. under inert nitrogen atmosphere. To this flask a catalyst solution containing 0.430 mg meso-ethylenebis(1-indenyl)zirconium dichloride (catalyst A available from Boulder Scientific Co.) and 0.8012 mg dimethylanilinium tetrakis(pentafluorophenyl)borate (activator B, from Strem Chemicals, Inc.) and 0.079 gram TIBA stock solution in 20 grams of toluene was added to the flask. After 20 hours at this temperature, 2 ml isopropanol was added. The reaction mixture was then washed with 100 ml aqueous NaOH (5 wt %), followed by two washes of 100 ml deionized water. The organic product was distilled at 160° C./1 mm-Hg vacuum to remove any light ends. The residual lube oil properties were summarized in Table 1

Examples 2 to 8 were conducted according to the procedure in Example 1, except they were conducted at different temperatures.

The catalyst productivity and product properties are summarized in Table 1.

Examples 9 to 14 were conducted according to the procedure in Example 1, except 0.456 mg of meso-dimethylsilylbis (tetrahydroindenyl)zirconium dichloride (catalyst C) was used with either 0.922 mg of trityl(tetrapentafluorophenyl) borate (activator D, from Strem Chemicals, Inc.) or 0.8012 mg activator B as activator.

The catalyst productivity and product properties are summarized in Table 2

Examples 15 to 17. A reaction flask containing 90 gram purified 1-decene was heated to 50° C., 70° C. or 125° C. under inert nitrogen atmosphere. A catalyst solution containing 0.585 gram 10 wt % methylaluminoxane (MAO) in toluene from Aldrich Chemical Co. and 1.736 mg of catalyst A was added slowly to the flask to avoid exotherm. After 20 hours at this reaction temperature, 2 ml isopropanol was added. The reaction mixture was worked up as described in Example 1. The properties of the residual lube fraction properties are summarized in Table 3.

Example 18 was conducted according to the procedure of Examples 15 to 17, except 1.736 mg of 0.585 gram meso-dimethylsilylbis(2-methylindenyl)zirconium dichloride (catalyst E) was used, instead of catalyst A, was used in the reaction. The results are summarized in Table 3.

Examples 15 to 18 are comparative examples. In these examples, the reaction conditions were similar to the present inventive examples, except that MAO is used as co-catalyst and no hydrogen was added. The catalyst productivities of these comparative examples were below 50 k of total product/g of metallocene.

Comparing to Table 3 (comparative examples) and the data from U.S. Pat. No. 6,548,724, the data in Table 1 and Table 2 (of the present invention) have consistently demonstrated that the inventive examples have a much high catalyst productivity of >50,000 g total product per gram of metallocene. In contrast, the examples of 6,548,724 and comparative examples have catalyst productivity of <50,000 g/g metallocene. Higher productivity is important for efficient commercial production.

Furthermore, the olefin type of the polymers made in Table 1 had significant amounts of 1,2-disubstituted olefin end groups, which after hydrogenation produce paraffins with structure A. This amount of structure A is as expected higher than Z mole %, $Z=8.420*Log(V)-4.048$, where V is the kinematic viscosity of the polyalpha-olefin measured at 100° C. in cSt.

TABLE 1

| | Example No. | | | | | | | |
|---|---|---|---|---|---|---|---|---|
| | 1 | 2 | 3 | 4 | 5 | 6 | 7 | 8 |
| Reaction Temp., ° C. | 37.5 | 50 | 70 | 76 | 84 | 93 | 94 | 100 |
| Wt % Conversion | 37.0 | 42.8 | 80.5 | 56.2 | 84.0 | 56.6 | 79.0 | 67.1 |

TABLE 1-continued

| | Example No. | | | | | | | |
|---|---|---|---|---|---|---|---|---|
| | 1 | 2 | 3 | 4 | 5 | 6 | 7 | 8 |
| Wt % Pdt Selectivity | | | | | | | | |
| Light fraction | 3.3 | 3.9 | 3.1 | 1.7 | 1.9 | 2.9 | 0.0 | 4.6 |
| lube | 95.8 | 96.1 | 96.9 | 97.9 | 98.1 | 96.7 | 100.0 | 95.4 |
| Lube Properties | | | | | | | | |
| V100° C., cSt | 3758.4 | 3715.4 | 1426.3 | 1359.8 | 724.78 | 631.93 | 583.72 | 363.22 |
| V40° C., cSt | 44796 | 44565 | 16328 | 17809 | 7800.6 | 6934.7 | 6408.3 | 3846.4 |
| VI | 380 | 379 | 326 | 321 | 291 | 280 | 275 | 250 |
| Pour Point, ° C. | | | | | −27 | | −29 | |
| g lube/g metallocene | 41,216 | 47,878 | 90,703 | 63,928 | 95,902 | 63,689 | 91,860 | 74,434 |
| g total pdt/g metallocene | 43,023 | 49,812 | 93,605 | 65,301 | 97,712 | 65,833 | 91,860 | 78,023 |
| Mn | 55053 | 31659 | | 14889 | 11270 | 9774 | 9265 | |
| MWD | 1.78 | 1.73 | | 2.23 | 2.13 | 2.13 | 2.15 | |
| Mole % Olefin Type by NMR | | | | | | | | |
| Vinylidene | 31.3 | | 43.7 | | | 46.6 | | 50.5 |
| 1,2-disubstituted | 51.2 | | 42.4 | | | 41.1 | | 40.2 |
| tri-substituted | 15.2 | | 10.8 | | | 8.9 | | 6.2 |
| vinyl | 2.3 | | 3.1 | | | 3.5 | | 3.1 |

Wt % conversion and product selectivities were determined by gas chromatography, using hexadecane as the internal standard for analysis. Mn and Mw were determined as described above.

TABLE 2

| | Example No. | | | | | |
|---|---|---|---|---|---|---|
| | 9 C + D | 10 C + D | 11 C + B | 12 C + D | 13 C' + B | 14 C' + B |
| Reaction Temperature, ° C. | 70 | 70 | 100 | 100 | 100 | 110 |
| Wt % Conversion | 88.7 | 86.9 | 55.2 | 70.1 | 77.9 | 61.4 |
| Wt % Pdt Selectivity | | | | | | |
| Light Fraction | 19.4 | 16.7 | 20.5 | 32.6 | 42.1 | 39.3 |
| lube | 80.6 | 83.3 | 79.5 | 67.4 | 57.9 | 60.0 |
| Lube Properties | | | | | | |
| V100° C., cSt | 18.51 | 12.3 | 8.89 | 14.58 | 6.63 | 7.5 |
| V40° C., cSt | 119.48 | 73.34 | 48.69 | 90.18 | 32.35 | 37.8 |
| VI | 164 | 155 | 153 | 158 | 154 | 158 |
| Pour Point, ° C. | | | | | | −60 |
| g lube/g metallocene | 78,391 | 79,372 | 48,118 | 51,806 | 49,456 | 40,436 |
| g total pdt/g metallocene | 97,259 | 95,285 | 60,526 | 76,864 | 85,417 | 67,341 |

C was meso-dimethylsilylbis[tetrahydroindenyl]ZrCl$_2$ available from Albemarle Corporation. C' was recrystallized C from toluene solution at room temperature.

TABLE 3

| | Example No. | | | |
|---|---|---|---|---|
| | 15 | 16 | 17 | 18 |
| temperature, ° C. | 50 | 70 | 125 | 70 |
| Wt % Conversion % | 93 | 93 | 59 | 67 |
| Wt % Pdt Selectivity | | | | |
| Light fraction | 1.5 | 2.5 | 24 | 2.3 |
| lube | 98.5 | 97.5 | 76 | 97.7 |
| Lube Properties | | | | |
| 100° C. vis, cSt | 1383.62 | 861.34 | 117.72 | 2339.9 |
| 40° C. vis, cSt | 15929.94 | 9733.34 | 1062.39 | 27349 |
| VI | 323 | 296 | 206 | 354 |
| pour point, ° C. | −27 | −30 | −41 | |
| g lube/g metallocene | 47,491 | 47,009 | 23,247 | 33,936 |
| g total pdt/g metallocene | 48,214 | 48,214 | 30,588 | 34,735 |
| g lube/g MAO | 1178 | 1191 | 606 | 1220 |

All documents described herein are incorporated by reference herein in their entirety, including any priority documents and/or testing procedures to the extent they are not inconsistent with this specification. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A process to produce a liquid poly-alpha-olefin comprising:
   a) contacting in a reaction zone, in the presence of below 20 psi hydrogen, one or more C3 to C20 alpha-olefin monomers with a non-coordinating anion activator, a single bridged meso-metallocene transition metal compound having less than about 35 wt % racemic isomer, and a co-activator selected from the group consisting of alkyl aluminum compounds and alkyl alumoxanes, provided that when the alkyl alumoxane is present it is present in a molar ratio of less than 0.1:1 of alkylalumoxane to meso-metallocene, and provided that when the alkyl aluminum compound is present it is present at a molar ratio of alkyl aluminum to meso-metallocene of from 2:1 to 10,000 to 1, where the molar ratio of activator to meso-metallocene is from 10:1 to 0.1:1, and provided that ethylene is not present at more than 30 volume % of the monomers entering the reaction zone, provided that the alpha-olefin monomers in the feed components are present in at least 20 weight % or more based upon the weight of the meso-metallocene, non-coordinating anion activator, co-activator, monomers, and solvent or diluent, and where:

i) the productivity of the process is at least 50,000 g of total product per gram of transition metal compound (where the total product is defined to be the total amount of product exiting the reactor, minus unreacted monomers and solvents);

ii) no more than 5% monomer is converted from olefin to alkane;

iii) the yield of product is greater than 95%; and b) obtaining a liquid polyalphaolefin product having a pour point of less than 25° C., a $KV_{100}$ of 3 to 1000 cSt, 10 weight % dimer or less and a viscosity index of 60 or more.

2. The process of claim 1, wherein the meso-metallocene is defined as

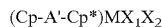
(Cp-A'-Cp*)MX$_1$X$_2$ wherein:
M is the metal center, and is a Group 4 metal;
Cp and Cp* are the same or different cyclopentadienyl rings that are each bonded to M, and substituted with from zero to four substituent groups S" being, independently, a radical group which is a hydrocarbyl, substituted hydrocarbyl, halocarbyl, substituted halocarbyl, silylcarbyl or germylcarbyl, or Cp and Cp* are the same or different cyclopentadienyl rings in which any two adjacent S" groups are optionally joined to form a substituted or unsubstituted, saturated, partially unsaturated, or aromatic cyclic or polycyclic substituent;
A' is a bridging group;
$X_1$ and $X_2$ are, independently, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand; or when Lewis-acid activators, such as methylalumoxane, which are capable of donating an X ligand as described above to the transition metal component are used, both X may, independently, be a halogen, alkoxide, aryloxide, amide, phosphide or other univalent anionic ligand or both X can also be joined to form a anionic chelating ligand.

3. The process of claim 2, wherein M is titanium, zirconium or hafnium.

4. The process of claim 1, wherein the $KV_{100}$ is 150 cSt to 1000 cSt or more.

5. The process of claim 1, wherein the $KV_{100}$ is 300 cSt to 1000 cSt or more.

6. The process of claim 1, wherein the $KV_{100}$ is 600 cSt to 1000 cSt or more.

7. The process of claim 1, wherein the pour point is $-10°$ C. or less.

8. The process of claim 1, wherein more than 95 wt % of the total product has greater than 18 carbon atoms.

9. The process of any of claim 1, wherein the process is continuous or semi-continuous.

10. The process of claim 1, wherein the meso-metallocene is meso-dimethylsilylbis(2-methylindeny) zirconium dihalide or mesoethylenebis(indenyl)zirconium dihalide.

11. The process of claim 1, wherein the meso-metallocene is meso-dimethylsilylbis(2-methylindeny)zirconium dialkyl or mesoethylenebis(indenyl)zirconium dialkyl.

12. The process of claim 1, wherein the co-activator is represented by the formula: $R'_3Al$, where each R' is, independently, selected from the group consisting of methyl, ethyl, n-propyl, iso-propyl, iso-butyl, n-butyl, t-butyl, n-pentyl, iso-pentyl, neopentyl, n-hexyl, iso-hexyl, n-heptyl, iso-heptyl, n-octyl, iso-octyl, n-nonyl, n-decyl, n-undecyl, n-dodecyl, n-tridecyl, n-tetradecyl, n-pentadecyl, n-hexadecyl, n-heptadecyl, n-octadecyl, and their iso-analogs.

13. The process of claim 1, wherein the non-coordinating anion activator is N,N-dimethylanilinium tetrakis(pentafluorophenyl)borate, N,N-dialkylphenylanilinium tetrakis(pentafluorophenyl)borate, trityl tetrakis(pentafluorophenyl)borate, tris(pentafluorophenyl)boron, tri-alkylammonium tetrakis(pentafluorophenyl)borate, tetra-alkylammonium tetrakis(pentafluorophenyl)borate, N,N-dimethylanilinium tetrakis(perfluoronapthyl)borate, N,N-dialkylphenylanilinium tetrakis(perfluoronapthyl)borate, trityl tetrakis(perfluoronapthyl)borate, tris(perfluoronapthyl)boron, tri-alkylammonium tetrakis(perfluoronapthyl)borate, or tetra-alkylammonium tetrakis(perfluoronapthyl)borate.

14. The process of claim 1, wherein the monomers are one or more of are selected from the group consisting of propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-uneicosene, 1-docosene, 1-tricosene, 1-tetracosene, 1-pentacosene, 1-hexacosene, 4-methyl-1-pentene, 4-phenyl-1-butene, and 5-phenyl-1-pentene.

15. The process of claim 1 wherein less than 20 wt % rac isomer is present.

16. The process of claim 1 wherein the poly-alpha-olefin contains less than 300 ppm of a Group 4 metal.

17. The process of claim 1 wherein the poly-alpha-olefin contains less than 100 ppm of a Group 13 metal.

18. The process of claim 1 wherein the poly-alpha-olefin contains less than 300 ppm of aluminum.

19. The process of claim 1 wherein the poly-alpha-olefin has an Mw/Mn of between 1.5 and 3.5.

20. The process of claim 1 wherein the poly-alpha-olefin has an Mw/Mn of between 1.5 and 2.5.

21. The process of claim 1 wherein the poly-alpha-olefin has a melting point of 0° C. or less or has no measurable melting point.

22. The process of claim 1 wherein the poly-alpha-olefin has less than 20 J/g of heat release.

23. The process of claim 1 wherein the poly-alpha-olefin has a Viscosity Index of 100 or more.

24. The process of claim 1 wherein the poly-alpha-olefin has a vinylidene disubstituted olefin content of more than 65 mol %.

* * * * *